United States Patent
Uchronski et al.

(10) Patent No.: US 9,135,038 B1
(45) Date of Patent: Sep. 15, 2015

(54) MAPPING FREE MEMORY PAGES MAINTAINED BY A GUEST OPERATING SYSTEM TO A SHARED ZERO PAGE WITHIN A MACHINE FRAME

(75) Inventors: Krzysztof Uchronski, Cambridge (GB); Martin O'Brien, Mountain View, CA (US); Jacob Gorm Hansen, Ryomgaard (DK); Kiran Bondalapati, Los Altos, CA (US); Ian Pratt, Cambridge (GB); Gaurav Banga, Cupertino, CA (US); Vikram Kapoor, Cupertino, CA (US)

(73) Assignee: Bromium, Inc., Cupertino, CA (US)

( * ) Notice: Subject to any disclaimer, the term of this patent is extended or adjusted under 35 U.S.C. 154(b) by 591 days.

(21) Appl. No.: 13/468,742

(22) Filed: May 10, 2012

Related U.S. Application Data

(63) Continuation-in-part of application No. 13/115,354, filed on May 25, 2011, now Pat. No. 8,972,980.

(60) Provisional application No. 61/349,717, filed on May 28, 2010.

(51) Int. Cl.
G06F 9/455 (2006.01)

(52) U.S. Cl.
CPC ........ *G06F 9/45533* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 6,789,156 B1 | 9/2004 | Waldspurger | |
| 6,948,044 B1 | 9/2005 | Chandrasekaran | |
| 7,171,523 B2 | 1/2007 | Yamasaki | |
| 8,146,084 B1 | 3/2012 | Meketa | |
| 8,151,263 B1 | 4/2012 | Venkitachalam et al. | |
| 8,346,727 B1 | 1/2013 | Chester et al. | |
| 8,543,641 B2 | 9/2013 | Cherukuri et al. | |
| 8,583,875 B1 * | 11/2013 | Garthwaite et al. | 711/147 |
| 8,656,386 B1 | 2/2014 | Baimetov et al. | |
| 2004/0128670 A1 | 7/2004 | Robinson et al. | |
| 2005/0149726 A1 | 7/2005 | Joshi et al. | |
| 2006/0101189 A1 | 5/2006 | Chandrasekaran et al. | |
| 2006/0117160 A1 * | 6/2006 | Jackson et al. | 711/170 |
| 2006/0136910 A1 | 6/2006 | Brickell et al. | |
| 2006/0143617 A1 | 6/2006 | Knauerhase et al. | |
| 2006/0184937 A1 | 8/2006 | Abels et al. | |

(Continued)

FOREIGN PATENT DOCUMENTS

WO 2008073618 A2 6/2008

OTHER PUBLICATIONS

Tim Sneath, "Mysteries of Windows Memory Management Revealed: Part Two", Oct. 2010.*

*Primary Examiner* — Emerson Puente
*Assistant Examiner* — Benjamin Wu
(74) *Attorney, Agent, or Firm* — Brokaw Patent Law PC; Christopher J. Brokaw

(57) ABSTRACT

Reducing an amount of memory used by a virtual machine. A system includes multiple virtual machines that share common pages of memory. The number of private pages associated with each virtual machine is minimized by ensuring that pages that a guest operating system regards as now free or zeroed are efficiently mapped by the hypervisor to a shared zero page. Upon a hypervisor determining that one or more guest physical frame numbers are assigned to free memory pages, the hypervisor updates mapping data to map the one or more guest physical frame numbers to a shared zero page within the machine frame.

23 Claims, 15 Drawing Sheets

(56) References Cited

U.S. PATENT DOCUMENTS

| | | |
|---|---|---|
| 2006/0288343 A1 | 12/2006 | Pallister |
| 2007/0180450 A1 | 8/2007 | Croft et al. |
| 2007/0192329 A1 | 8/2007 | Croft et al. |
| 2008/0001958 A1 | 1/2008 | Vembu et al. |
| 2008/0059556 A1 | 3/2008 | Greenspan et al. |
| 2008/0072276 A1 | 3/2008 | Pouliot |
| 2008/0244028 A1 | 10/2008 | Le et al. |
| 2008/0244579 A1 | 10/2008 | Muller |
| 2009/0007242 A1 | 1/2009 | Subramanian et al. |
| 2009/0119541 A1 | 5/2009 | Inoue et al. |
| 2009/0125902 A1 | 5/2009 | Ghosh et al. |
| 2009/0165133 A1 | 6/2009 | Hwang et al. |
| 2009/0172660 A1 | 7/2009 | Klotz, Jr. et al. |
| 2009/0172820 A1 | 7/2009 | Watson |
| 2009/0249472 A1 | 10/2009 | Litvin et al. |
| 2009/0260007 A1 | 10/2009 | Beaty et al. |
| 2009/0276783 A1 | 11/2009 | Johnson et al. |
| 2009/0313620 A1 | 12/2009 | Sedukhin et al. |
| 2009/0328033 A1 | 12/2009 | Kohavi et al. |
| 2010/0058042 A1 | 3/2010 | Locker et al. |
| 2010/0088474 A1* | 4/2010 | Agesen ............... 711/147 |
| 2010/0122343 A1 | 5/2010 | Ghosh et al. |
| 2010/0235831 A1 | 9/2010 | Dittmer |
| 2010/0257523 A1 | 10/2010 | Frank |
| 2010/0299667 A1 | 11/2010 | Ahmad et al. |
| 2011/0035494 A1 | 2/2011 | Pandey et al. |
| 2011/0173251 A1 | 7/2011 | Sandhu et al. |
| 2011/0209140 A1 | 8/2011 | Scheidel et al. |
| 2011/0225582 A1 | 9/2011 | Iikura et al. |
| 2011/0271070 A1* | 11/2011 | Worthington et al. ........ 711/165 |
| 2011/0296412 A1 | 12/2011 | Banga et al. |
| 2011/0296487 A1 | 12/2011 | Walsh |
| 2011/0302577 A1 | 12/2011 | Reuther et al. |
| 2012/0089666 A1 | 4/2012 | Goswami et al. |
| 2012/0131259 A1* | 5/2012 | Baskakov et al. ............. 711/6 |
| 2012/0239850 A1* | 9/2012 | Qiu et al. .................. 711/6 |
| 2012/0311560 A1 | 12/2012 | Dobrovolskiy et al. |
| 2013/0024644 A1 | 1/2013 | Givargis et al. |
| 2013/0031293 A1* | 1/2013 | Van Riel .................. 711/6 |
| 2013/0097358 A1* | 4/2013 | Li et al. ................... 711/6 |
| 2013/0159987 A1 | 6/2013 | Shi et al. |
| 2013/0290596 A1* | 10/2013 | Corrie ..................... 711/6 |
| 2013/0339568 A1* | 12/2013 | Corrie ..................... 711/6 |
| 2015/0058580 A1* | 2/2015 | Lagar Cavilla et al. ...... 711/149 |

* cited by examiner

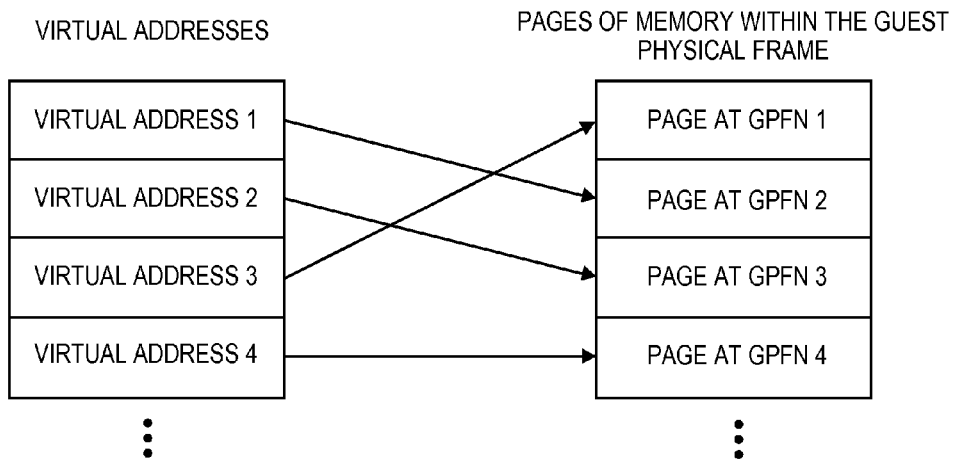
FIG. 10
(PRIOR ART)
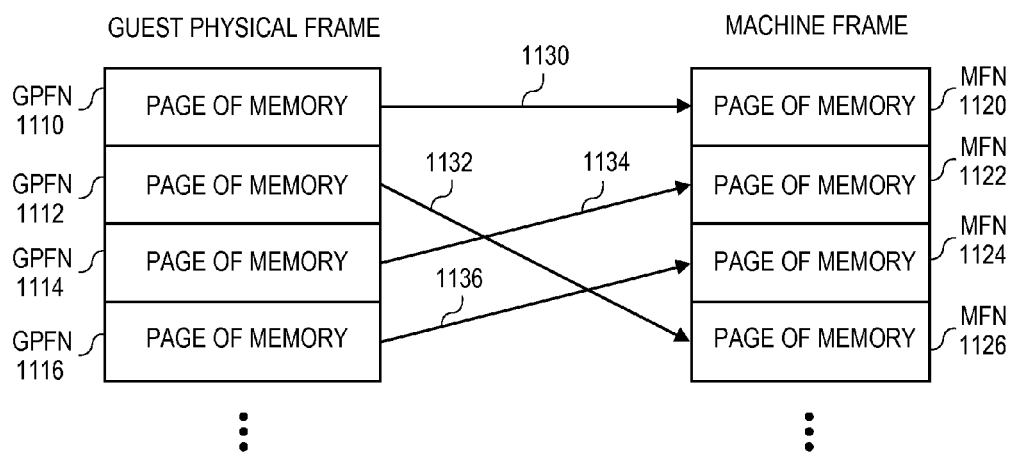
FIG. 11

US 9,135,038 B1

MAPPING FREE MEMORY PAGES MAINTAINED BY A GUEST OPERATING SYSTEM TO A SHARED ZERO PAGE WITHIN A MACHINE FRAME

RELATED APPLICATION DATA

This application is a continuation-in-part of, and claims priority to, U.S. non-provisional patent application Ser. No. 13/115,354, filed May 25, 2011 now U.S. Pat. No. 8,972,980, entitled "Approaches for Securing an Internet Endpoint using Fine-Grained Operating System Virtualization," the contents of which are hereby incorporated by reference for all purposes as if fully set forth herein.

Note that U.S. non-provisional patent application Ser. No. 13/115,354 claims priority to U.S. Provisional patent application Ser. No. 61/349,717, filed May 28, 2010, the contents of which are hereby incorporated by reference for all purposes as if fully set forth herein.

This application is related to U.S. non-provisional patent application Ser. No. 13/223,091, filed Aug. 31, 2011, entitled "Automated Management of Virtual Machines To Process Untrusted Data Based On Client Policy Information," the contents of which are hereby incorporated by reference for all purposes as if fully set forth herein.

This application is related to U.S. non-provisional patent application Ser. No. 13/302,123, filed Nov. 22, 2011, entitled "Approaches for Efficient Physical to Virtual Disk Conversion," the contents of which are hereby incorporated by reference for all purposes as if fully set forth herein.

This application is related to U.S. non-provisional patent application Ser. No. 13/419,345, filed Mar. 13, 2012, entitled "Seamless Management of Untrusted Data Using Virtual Machines," the contents of which are hereby incorporated by reference for all purposes as if fully set forth herein.

This application is related to U.S. non-provisional patent application Ser. No. 13/468,781, filed May 10, 2012, entitled "Preparing a Virtual Machine for Template Creation," the contents of which are hereby incorporated by reference for all purposes as if fully set forth herein.

This application is related to U.S. non-provisional patent application Ser. No. 13/468,805, filed May 10, 2012, entitled "Managing the Eviction Process," the contents of which are hereby incorporated by reference for all purposes as if fully set forth herein.

This application is related to U.S. non-provisional patent application Ser. No. 13/468,843, filed May 10, 2012, entitled "Mitigating Eviction by Maintaining Mapping Tables," the contents of which are hereby incorporated by reference for all purposes as if fully set forth herein.

FIELD OF THE INVENTION

Embodiments of the invention relate to reducing the memory requirements of guest operating systems in a multiple virtual machine environment.

BACKGROUND

Ensuring the security of Internet users and Internet connected devices is one of the grand challenges facing us today. The current state of affairs is very problematic, as our cyber-security infrastructure is easily and routinely subverted by cyber criminals, resulting in great economic loss. Every year brings deeper and more complex dependence by society on our cyber-infrastructure, and yet at the same time the cyber-security problem only worsens as the capabilities of the cyber-criminal mature. In effect, we are building mission-critical dependence into virtually every aspect of human activities on a cyber-infrastructure that is very insecure at its core.

The current state of our cyber-security infrastructure is due, at least in part, to two fundamental limitations. The first limitation is a fundamental mismatch between the design assumptions made by computer security programmers with how the vast majority of users interact with the cyber-infrastructure (the "Security Model Complexity" problem). The second limitation is a lack of appropriate isolation of code and data from trusted and untrusted sources in modern computer systems (the "Lack of Isolation" problem). These two limitations of current systems are somewhat orthogonal, but are both very important for securing a computer system. The "Lack of Isolation" problem, in particular, is very important because modern computer devices, such as a PC or cell phone, are typically general purpose devices that execute a wide variety of software from different sources.

The general purpose capability of modern computing systems is constructed using a layered stack of hardware and software. An example of the layered arrangement of hardware and software that is present in modern computer systems is shown in FIG. 1. At the lowest layer, there is hardware with a small number of basic general purpose programming capabilities. Upon this hardware layer sits the firmware/BIOS which is responsible for, among other things, initializing hardware resources and loading the operating system. The operating system (OS) provides a file system and functionality which may be used by a variety of different applications. On top of the OS layer run the various applications which provide user-visible rich functionality to the computer. The functionality provided by the application layer is typically the primary concern of the computer user.

One advantage and consequence of the layered nature of modern computer systems is that the various layers may come from different vendors, as long as the layers conform to the specifications governing the layer boundary (which may be based on open or proprietary industry standards). To illustrate an example, in a typical PC today the hardware may be constructed around processor and chipset technology provided by Intel or AMD. The firmware/BIOS may be provided by companies like Insyde, AMI or Phoenix Technologies and may be written to conform to several industry specifications such as UEFI and PI. The operating system (OS) may originate from a company like Microsoft or Apple or may be a flavor of the Linux open source OS. Finally, the applications themselves are usually written to the specification of one of the operating systems and may be provided by one of a large multitude of application vendors or obtained from a variety of different sources.

Note that some of the applications may themselves have a layered architecture. A web browser, for example, typically includes a browser core and may also download web applications in the form of HTML, JavaScript and Flash programs from various Internet web sites. The web browser may run these downloaded web applications locally on top of the browser core. A typical web page contains HTML with embedded JavaScript that can change the HTML being rendered by the web browser dynamically based on user actions without having to re-download the web page from the web server. The HTML may also demarcate part of the web page to be rendered by a plug-in, which is typically a separate program that is installed on the computer. Plug-ins are often downloaded from different sources over the World Wide Web. Thus, a modern computer runs code that comes from a variety of different sources. In particular, application programs may originate from literally millions of different sources once we consider the collection of traditional local applications as well as web applications that are downloaded from web sites.

The integrity of a computer system when it runs application code from different sources (or even the same program being run by different users of a shared computer) has traditionally been one of the responsibilities of the OS. The OS uses various hardware and software constructs like virtual memory, processes, and file permissions to prevent programs belonging to one user from affecting programs (and data) belonging to another user. This responsibility of the OS to "isolate" programs and data from one another often tends to compete with another responsibility of the OS, which is to allow for cooperation between programs especially between user application programs and system level services such as shared library modules, database services, and other higher-level common OS functionality. These two OS functions, to share and to isolate, require the OS designer to make certain tradeoffs on how much to share and how much to isolate.

As a result of these design tradeoffs, the resulting implementation of modern operating systems has grown to a complexity such that ensuring the OS has no security issues is impractical. In mature operating systems, the security implementation is typically robust enough to work well for normal programs under normal usage with no adverse impact on the operation of the computer. However, most OS implementations are very large and complex bodies of computer code that may not possess a sufficiently robust security system when interacting with programs that are especially designed to take advantage of less-tested or unvalidated corner cases in the operation of the security subsystem.

These "security vulnerabilities" are not important for well-behaved programs during typical operation, but are used extensively by cyber criminals to subvert the computer's security subsystems. Once the system's security is subverted, it is generally possible for cyber criminals to run any software under their control on the subverted computer system.

The Lack of Isolation problem stems from the fact that a large amount of code executed by computers today comes from sources outside the computer, some of which have explicit intentions of committing criminal activities. This includes any program downloaded from the Internet or any web site visited by the computer. All downloaded programs (good and bad) have the same OS and library services available to them to use during their operation. Consequently, any program (even malware), can exploit any security vulnerability in the complex OS or web browser environment and subvert the security subsystem that isolates applications from one another. For example, when a user visits a web site, he or she is really running web application code developed by the publisher of the web site. If this web site is malicious, then malware may be executed on the computer. Malware may be designed to exploit a security vulnerability in the web browser to take control of the computer system during subsequent web site visits, e.g., if you visit your bank's web site, your key strokes may be captured and your login/password information for the bank may be transmitted to the malware publisher. Malicious programs may be designed for a variety of purposes, e.g., a malicious program may simply be designed to interfere with the normal operation of a computer rather than extracting useful data from the computer.

While some computer security professionals may understand the existence of the Lack of Isolation problem, this problem is hard to solve in any practical way because preventing applications from working or communicating with each other tends to conflict with achieving the goal of increasing seamless communication between different local and web applications. There has been some work towards the isolation of web code from different sources being run by a web browser. Modern browsers have attempted to create a level of sandboxing around downloaded web application code in order to isolate downloaded code from the rest of the computer and from each other. However, these models are fairly primitive in their ability to deal with the full gamut of security issues that arise during the course of a typical user's web experience. For example, certain versions of Google's Chrome web browser's sandboxing does not address safety issues arising from downloaded browser plug-ins and various types of native executables; thus, every computer system running certain versions of Chrome is vulnerable to a zero day exploit attack against Adobe Flash or Microsoft Word as much as if the system was running a less secure or older browser with the same Adobe Flash Plug-in or Microsoft Word plug-in.

Web browsers have been burdened with the need to ensure full compatibility to older and non-standard web pages in their efforts to provide superior safety and privacy. For example, web browser programmers have had to make some relaxations in order to correctly render popular web sites that rely on the sharing of information between web sites.

Last but not least, most web browsers vendors suffer from a huge conflict of interest because their business relies upon monetizing the web browsing habits of their users within their own business processes and with their industry partners. This monetization relies on data about users' browsing habits which is contained in the web cookies that are set and later provided to web servers during the course of web sessions. Companies such as Google and Microsoft have a great interest in learning as much as possible about a person's browsing habits and typically arrange the default privacy settings of web browsers to be advantageous to them (but less than optimal from a security and privacy standpoint). This choice of default privacy and core functionality settings causes web browsers to transfer large amounts of sensitive information from end users' machines to Internet related businesses, such as Google, Microsoft, Apple, etc., thereby allowing such businesses to better monetize their customer base by offering appropriate products and services and serving targeted ads. These same settings, however, can be leveraged by malicious parties to exploit security vulnerabilities. While all web browsers provide some level of control to the sophisticated user to tune his or her web browser functionality and/or privacy/safety settings to browse more securely, the vast majority of users never change these default settings.

Some security researchers have also proposed the use of "client virtualization" (also called "Virtualization using a Hypervisor" in the desktop) to solve the Lack of Isolation Problem. In one form of client virtualization, the user runs multiple independent operating systems on their laptop or desktop on multiple virtual machines (VMs) within the client system which have been created using a hypervisor, such as from VMWare of Palo Alto, Calif. or Virtual PC, available from Microsoft Corporation of Redmond, Wash. When client virtualization is used to achieve improved security, different VMs are used to run applications from different sources or of different types. For example, an OS in one VM may be dedicated for accessing the corporate network that the user may be part of and running corporate applications (local and web). Another OS in a second VM might be used by the user to run his or her personal programs and store personal documents. Finally, a different OS in a third VM may be used for general web browsing on the wider Internet and running native executables that may have been downloaded from the Internet. An example of such a solution is XenClient, which is made by Citrix Systems of Ft Lauderdale, Fla.

The use of classical client virtualization, as discussed above, to solve the general code isolation problem in the context of Internet endpoints suffers from several drawbacks. A first drawback is that there is too much management overhead for the end-user. The end-user has the onus of making the decision as to what VM to use for each activity. Any mistake, intentional or accidental, may subvert the integrity of the system. While many safeguards can be added as a layer on top of the core virtualization technology to help prevent the user from making mistakes, this has not yet been demonstrated to work in a practical and robust fashion.

An additional drawback is that client virtualization, as described above, suffers from the problem that any VM that is used for general web browsing is just as vulnerable to a security problem as any monolithic system running a single VM while accessing web sites on the general Internet. Therefore, it is quite likely that the VM dedicated to web browsing described in the arrangement above will be subverted by malware eventually. Any subsequent activities in that VM, then, will be compromised.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 10 is an illustration depicting a prior art approach of mapping virtual addresses to guest physical frame numbers;

FIG. 11 is an illustration of the mapping, maintained by a hypervisor, between guest physical frame numbers (GPFNs) and machine frame numbers (MFNs) according to an embodiment of the invention;

DETAILED DESCRIPTION OF THE INVENTION

Approaches for securing an Internet endpoint from being compromised by malicious code executing thereon through the use of fine-grained operating system (OS) virtualization are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention reduce the amount of physical memory used by a virtual machine. A virtual machine may be instantiated by, among other things, performing a copy-on-write operation on the pages within the guest physical frame within a template virtual machine to create the guest physical frame for the newly instantiated virtual machine. Mapping data that maps physical frame numbers associated with the guest physical frame for the newly instantiated virtual machine to machine frame numbers associated with memory pages within a machine frame is updated. Guest physical frame numbers in different virtual machines may map to the same machine frame number, even if the guest physical frame numbers are in different positions within their respective guest physical frame. Mapping data may also map locations in the page file to locations in a template virtual machine as well as map disk offsets to machine frame numbers to avoid reading, whenever possible, from the page file or system disk.

Figure 1:
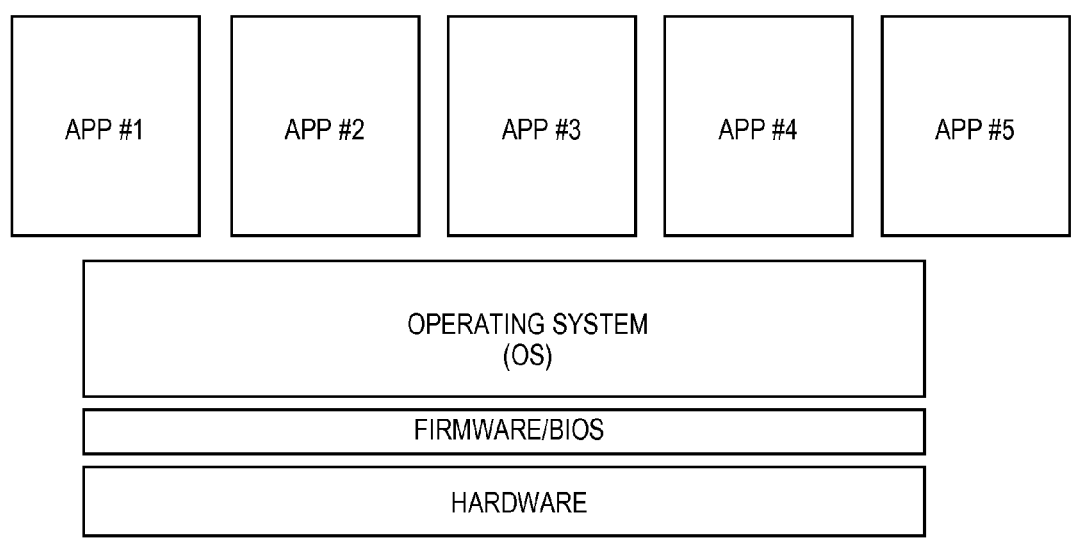
FIG. 1 is an illustration of the layered arrangement of hardware and software present in modern computer systems.
Figure 2:
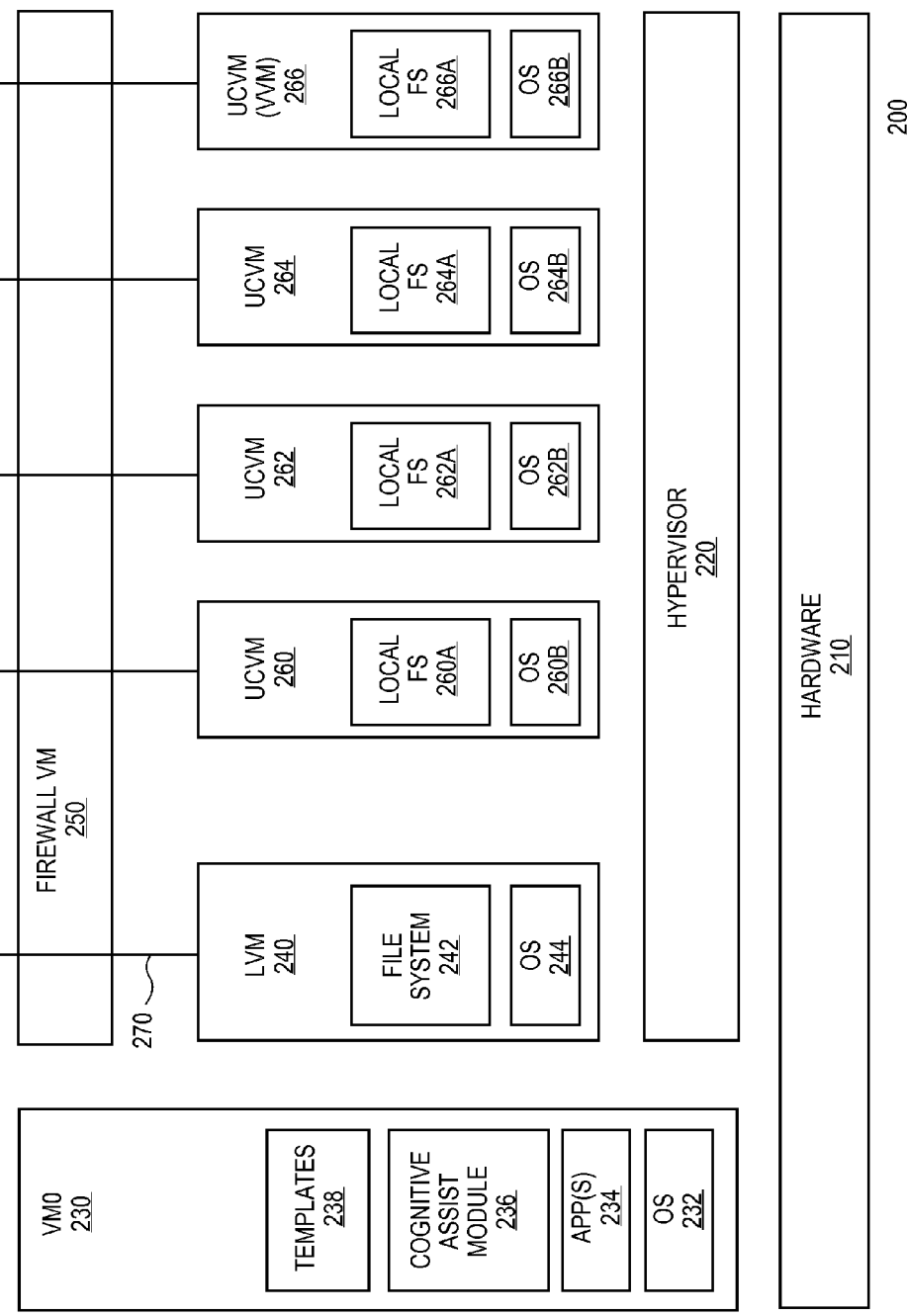
FIG. 2 is an block diagram of the functional components of one embodiment of the invention.

A block diagram of client 200 according to one embodiment of the invention is shown in FIG. 2. The term "client," as broadly used herein, represents any type of Internet endpoint or computer system capable of connecting to a network and executing a virtual machine. Non-limiting, illustrative examples of client 200 include a PC, a laptop computer, a tablet computer, a cell phone, a personal digital assistant (PDA), and the like.

In an embodiment, client 200 may correspond to a server. Thus, while use of the term "client" in other contexts might exclude an interpretation that includes a server, as broadly used herein, client 200 may be embodied on a wide variety of machines, one example of such being a server. Thus, as the Applicant may be his or her own lexicographer, as used herein, the term client 200 expressly includes a server. For example, non-limiting, illustrative examples of client 200 include a web server, an application server, a file server, and a cloud server. Indeed, implementing embodiments of the invention upon a server may yield many benefits. The micro-virtualization techniques employed by embodiments provide an efficient, scalable mechanism for (a) reducing the amount of physical memory required by a virtual machine and (b) eliminating the risk of executing untrusted code and/or interpreting untrusted data in accordance with different policies to manage such risk. As such, a device, such as a server, which interacts with (a) numerous sources of untrusted code and/or data and/or (b) two or more corporate entities having different policies towards managing the risk of untrusted code and/or data, may benefit from embodiments of the invention.

Client 200 includes a number of virtual machines (such as 230, 240, 250, and 260, for example) that execute on hardware 210 of client 200. The various VMs within client 200 may be used for separately executing processes associated with different activities. One such VM, namely "VM0" (i.e., VM0 230 of FIG. 2), is secured so that VM0 may serve as the root of trust with a guaranteed integrity. VM0 may contain core operating system 232 and one or more applications 234. In the embodiment shown in FIG. 2, VM0 is not accessible over any network, such as the Internet. As shall be explained below, VM0 provides a secure environment in which operating system 232 and one or more applications 234 may execute without risk of exposure to malicious code.

Other VMs, such as VMs 260, 262, 264, and 266 in FIG. 2, may be created, maintained, and destroyed on-demand using a very efficient micro-virtualizing hypervisor 220. Generally, there are two types of hypervisors. Type 1 (or native, bare metal) hypervisors run directly on the host's hardware to control the hardware and to manage guest operating systems. A guest operating system thus runs on another level above the hypervisor. Type 2 (or hosted) hypervisors run within a conventional operating system environment. With the hypervisor layer as a distinct second software level, guest operating systems run at the third level above the hardware. In other words, Type 1 hypervisor runs directly on the hardware; a Type 2 hypervisor runs on another operating system, such as Windows. Embodiments of the invention may use any type of hypervisor. Thus, hypervisor 220 in FIG. 2 may either be a Type 1 or a Type 2 hypervisor.

Using the efficient micro-virtualization techniques of embodiments, the latency of starting and stopping activities or applications which run in their own VM in embodiments is very low, thereby providing a practical user experience while employing full OS virtualization. Embodiments address and overcome many disadvantages, such as the Lack of Isolation Problem, experienced by modern general purpose computer systems that execute code from different sources and of differing trust levels; nevertheless, embodiments maintain compatibility with current typical real-world usage of computer systems by corporate and non-corporate users. This is so because any activity which is not previously deemed trustworthy is performed in a separate VM by certain embodiments, and so all code which may be potentially malicious is executed in its own VM that is destroyed after its immediate use is ended, thereby preventing any malicious code from effecting any lasting change to a computer system according to an embodiment of the invention.

The Trusted Virtual Machine—VM0

In an embodiment of the invention, a special virtual machine, referred to herein as "VM0," is created to be a trusted and secure portion of a computer system. FIG. 2 depicts VM0 230 according to an embodiment. To achieve the property of being trusted and secure, VM0 230 may be permanently disconnected from any network (i.e., VM0 230 is not connected to any local network or the Internet). Specifically, VM0 230 may not contain any type of networking stack, such as a TCP/IP network stack, and may not have access to any networking hardware that could allow for communication between VM0 230 or any applications 234 executed thereby and the Internet. Thus, to install software onto VM0 230, it is typically required to have physical custody of client 200 and manually install the software onto VM0 230. Note that a client may contain any number of VM0 virtual machines. While FIG. 2 depicts an embodiment comprising a single VM0, other embodiments may comprise two or more VM0s.

Thus, in certain embodiments, one or more applications 234 executing within VM0 230 do not have any access to a network, must be fully self contained in their functionality, and must rely only on local code and data for all their functionality. All applications that need to access the network will therefore need to run in a separate virtual machine outside of VM0 230, as shall be described in further detail below. It is envisioned that the software (such as one or more applications 234) running in VM0 be selected at the time client 200 is manufactured or first configured for use in a controlled environment. Because VM0 230 is never connected to any type of network, such as a TCP/IP network, all common types of network initiated attacks cannot be waged against VM0 230, thereby rendering VM0 230 immune to such attacks and safe as compared to any computer or VM that is connected to the Internet.

In an embodiment where hypervisor 220 is a Type 2 hypervisor, when client 200 is booted, only VM0 230 is started by the BIOS or firmware of client 200. Once VM0 230 is running, VM0 230 can start hypervisor 220 immediately or on demand. In another embodiment, where hypervisor 220 is a type 1 hypervisor, hypervisor 220 is first started by the BIOS when client 200 is booted and VM0 230 is launched by the Hypervisor 220. Hypervisor 220 is a software component that is responsible for creating other VMs which each execute independent instances of the operating system. These additional VMs are instantiated by VM0 230 and/or hypervisor 220 to run any untrusted code or code that needs to access the network. Untrusted code in this context is any code which has not been pre-approved as being trusted by an IT administrator of client 200. The additional VMs are started "silently" and automatically by client 200, e.g., these VMs are started transparently to the user and without the user having to do anything explicit. These additional VMs are also not explicitly visible to the user; instead, all the user sees on the desktop is familiar objects (such as icons, windows, and applications) without any indication that multiple VMs are executing in client 200. Embodiments of the invention follow rules that govern what application activities are assigned to which particular VM. These rules are described below in greater detail.

In another embodiment (not depicted in FIG. 2), VM0 230 may have a networking stack that is firewalled off from the network using well-tested firewall software, thereby allowing VM0 230 to have access to a computer network. Such an embodiment may only allow connections with a specific Internet system so that the software inside VM0 230 may be updated from a designated update server. For example, the firewall software may only allow VM0 230 to connect to one or more servers associated with the IT administrator of client 200 and may prevent VM0 230 from establishing a connection with any other endpoint on any network.

Interaction with a User Interface

All code responsible for generating a user interface (UI) not associated with an application may be maintained in VM0 230. Consequently, all UI interaction activity with the desktop between a user and software executing on client 200 may take place between the user and VM0 230, which maintains a unified desktop for all applications running in all VMs. Interaction between the user and applications running in VMs other than VM0 230 takes place indirectly via VM0 230. For example, when the user enters a password for a web site whose browser and HTML/JavaScript code is running in an untrusted VM, the password is first directly provided to VM0, which then transfers the information to the untrusted VM. Furthermore, the untrusted VM's display is rendered on to a virtualized display, which is then composed into the VM0 desktop (as appropriate) by controlling code running in VM0 230. As code executing in VM0 230 is trusted, the user may trust any user interface controls displayed on a screen since all code responsible for rendering the user interface is trusted.

This approach is quite different from prior systems where often the code that controls the full desktop experience is untrusted. Consequently, if the code responsible for generating the user interface is corrupted by malware, then the user interface may be used as a tool to deceive the user. For example, malware may cause a user interface control to be displayed that requests the user to submit an authentication credential which will be used for improper purposes by the malware. However, this problem is overcome by embodiments of the invention—since all code responsible for rendering user interface controls executes in a secure location, such as the host or VM0, malware is prevented from hijacking or corrupting code responsible for rendering a user interface.

Figure 7:
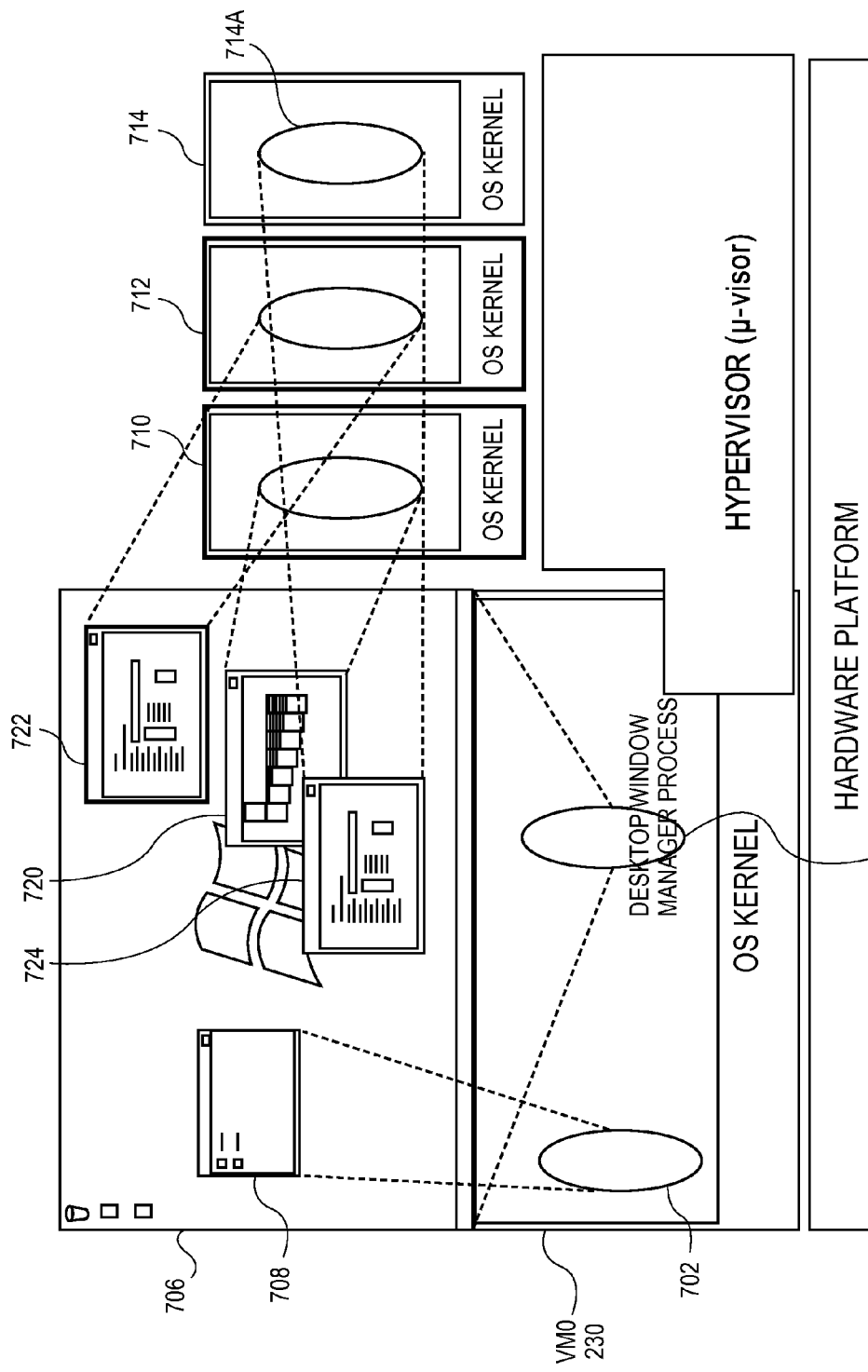
FIG. 7 is an illustration of exemplary desktop of a client according to an embodiment of the invention.

To illustrate an embodiment of the invention, consider FIG. 7, which is an illustration of exemplary desktop of client 200 according to an embodiment. As shown in FIG. 7, process 704 is responsible for rendering desktop 706 on a physical display of client 200. Process 714A runs in untrusted VM 714 and does not have complete access to the file system of client 200. When any process inside VM 714 requests access to the file system of client 200, it is intercepted and process 702 is responsible for rendering a window 708 depicting the contents of the file system of client 200. Process 702 has the option of selectively displaying which contents are available to the VM 714 based on policies as set forth by the IT administrator or the user. VM 710 in FIG. 7 that runs the solitaire game is implemented such that the display of VM 710 is a virtualized display, which is then composed into the desktop 706 (as appropriate) by controlling process 704 running in VM0 230. The displays of VMs 712 and 714 are rendered on the desktop 706 in a similar fashion.

Note that in certain embodiment code that is responsible for rendering a user interface may execute in both the host and one or more virtual machines, such as VM0. In such a case, the UI-rendering code executing in the host will assemble all the off-screen buffers of the UI-rendering code executing in the virtual machines to present a single on-screen image. As a result, the UI-rendering code executing in the host may render certain content portions differently based on whether they are trusted or not. For example, a window frame may be displayed having a particular color by the UI-rendering code executing on the host to signify that the content displayed therein originated from an untrusted source. Any type of visual identifier, such as a color, font, graphic, or banner may be used to signify that content originated from an untrusted source.

The Legacy Virtual Machine—LVM

FIG. 2 depicts a legacy virtual machine (LVM) 240 according to an embodiment of the invention. LVM 240 may contain operating system 244. LVM 240 serves as the primary entity being managed by the IT administrator of client 200. As such, LVM 240 provides an environment that is analogous to the managed enterprise OS of corporate computer system in that an IT department may install and maintain various enterprise applications within operating system 244 of LVM 240. In an embodiment, operating system 244 of LVM 240 may correspond to a Microsoft Windows OS or any other general purpose OS such as Linux or MacOS.

In an embodiment, LVM 240 is responsible for storing the main file system 242 of client 200. File system 242 may contain the user's profile folder containing the user's settings and files.

LVM 240 typically only runs infrastructure OS programs and programs that are used for the purpose of managing client 200 and trusted enterprise applications. Other user programs (especially those that involve external components or consume untrusted data) do not run in LVM 240, but instead, run elsewhere in separate VMs (such as a UCVM as described in more detail below).

In an embodiment, the network access of LVM 240 is restricted to just the corporate network as implemented by firewall VM 250. Firewall VM 250 is a specialized virtual machine that comprises firewall software/applications to restrict network access of VMs running in client 200 to appropriate and/or necessary network access points. Such practice is consistent with the need for only the responsible IT administrator to be capable of connecting to LVM 240 to manage LVM 240 and processes executing therein.

In one embodiment, LVM 240 and VM0 230 may be implemented in a single virtual machine.

Untrusted Code Virtual Machine—UCVM

When a user wishes to run any application that requires access to either a network or untrusted data (untrusted data is any data that originates from outside client 200), the application is run inside a dedicated VM that is created on-demand by hypervisor 220. This dedicated VM is called an Untrusted Code Virtual Machine (or UCVM). FIG. 2 depicts several UCVMs, namely UCVM 260, 262, 264, and 266. A UCVM operates under the assumption that, in general, any code that connects to the network and interacts with arbitrary code executing on an external device may at some point be compromised. This assumption also applies to trusted applications that interact with data originating from outside the computer system executing the trusted application, because such data may, at some point, contain embedded malicious code. To address such possibilities, such applications are executed in a UCVM to prevent any malicious code, inadvertently introduced into the UCVM, from having the capacity to affect any change outside of the UCVM.

In an embodiment, a UCVM is created by (a) cloning a copy of LVM 240, or a stripped-down version of LVM 240, in memory and (b) providing access to a restricted file system to the newly created UCVM. For example, UCVM 260 comprises restricted file system 260A, UCVM 262 comprises restricted file system 262A, and UCVM 264 comprises restricted file system 264A. Each UCVM possesses its own instance or copy of the operating system, which is isolated and separate from the main operating system (including its code and data) executing within VM0 230 or LVM 240. For example, UCVM 260 comprises operating system 260B, UCVM 262 comprises operating system 262B, and UCVM 264 comprises operating system 264B.

To provide a low latency user experience, UCVMs may not be booted from scratch each time an application is needed to be started. Instead, a UCVM may be created very quickly by cloning the UCVM from a template VM (with a booted OS) that has been pre-loaded in memory at system boot time. In an embodiment, the template used to clone a UCVM may be selected from templates 238 stored in VM0 230. A variety of techniques can be employed to make this cloning operation as fast as a few 100 milliseconds. Multiple types of templates may be used by a system to create UCVMs depending the nature and type of application(s) to be run inside the UCVM, as discussed in greater detail below in the section entitled "Cloning a UCVM from a Template."

Cognitive assist module 236 is software that is responsible for implementing the rules and policies of embodiments as well as helping the user of client 200 in understanding and navigating the security model employed by client 200 on an as-needed basis. Cognitive assist module 236 helps decide what activities run in which UCVMs, including when VMs are created or destroyed, and what kind of access to network and file system resources each UCVM has. Cognitive assist module 236 also helps protect the user, e.g., when a user is fooled by malware running in a UCVM and is in the process of providing some information that they have previously provided to enterprise code running in LVM 240 (for example a password), then cognitive assist module 236 may detect this situation and prevent the user from providing the information (which may be secret corporate information) to the malware.

Regarding the restricted file system of each UCVM, each UCVM has access to a private copy of a subset of the files in file system 242 on client 200. A UCVM may only have access to those files which the UCVM should need for the correct operation of the application executing therein. For example, user files are usually not required for correct operation of an application executing in a UCVM and thus are not typically exposed to a UCVM. On the other hand, if a UCVM is created as a result of the user wishing to edit a document using an application, such as MS Word, then a copy of the document the user wishes to edit will be provided to the restricted file system of the UCVM at the time the UCVM is created. Advantageously, using UCVM 260 as an example, if a process executing within UCVM 260 makes any changes to any files in restricted file system 260A, then these changes do not impact the files stored in file system 242 maintained in LVM 240 because such changes are only made to restricted file system 260A maintained in the UCVM and are not propagated, without express consent from the user, to file system 242 maintained by LVM 240.

In a typical use case of a UCVM, the UCVM may run a local application or an individual web page session. When a user is done running the local application or navigates away from a web page to another page with a different Internet URL domain, the corresponding UCVM is destroyed. Any new local application or web application will be run inside a brand new, separate UCVM that is cloned again from a clean UCVM master template. Thus, if there has been any compromise to the UCVM during the course of running some malicious code that was introduced into the UCVM, then the adverse affects of the security breach are isolated to only the affected UCVM and are lost when the UCVM is destroyed.

For example, assume that a user double-clicks on a MS Word document icon in Windows Explorer. Embodiments create a special UCVM to run the MS Word process. In a particular embodiment, cognitive assist module 236 of VM0 230 may dynamically create the UCVM using a template in one or more templates 238 or use a pre-existing template in memory or on the disk. The template selected by cognitive assist module 236 may be selected based on what activity is to occur within the UCVM, i.e., the selected may be designed to create a UCVM having characteristics that are optimal for running a text editor therein. The created UCVM contains a copy of the operating system as well as a restricted (local) copy of the file system. This local copy of the file system in the UCVM contains all the usual Windows and Program files; however, the user's profile folder in the local copy of the file system contains only the single target MS Word document being opened.

As another example, assume that three tabs are open in a web browser and further assume that each tab is open at a different web page. In consideration of the code which may be contained or embedded on a web page, each web page may be properly considered a web application. In embodiments of the invention, the code responsible for rendering the user interface (UI) of the web browser runs in VM0 230. On the other hand, executable code for the three web applications runs in three separate UCVMs. A core HTML/JavaScript engine runs in each of the three UCVMs. A copy of the file system within each of the three separate UCVMs does not contain any part of the user's files, as they are not required for the task performed by each UCVM, namely displaying a web page. Thus, each web application (or web page in this example) is completely isolated from the rest of the system.

In an embodiment, a UCVM may be connected to the Internet according to an access policy determined by the nature of the code running within the UCVM. To illustrate, web pages are typically restricted as per a strict "same origin policy" similar to the rules implemented by modern web browsers. In the "same origin policy," scripts running on web pages are permitted to access methods and properties of other scripts originating from the same site with no specific restrictions, but are prevented from accessing most methods and properties across web pages on different sites. Untrusted native applications running outside of the web browser are restricted by default to be able to connect only to the domain from which the program was downloaded (and to specific content delivery networks (CDNs) that may be in use by the domain in question).

This level of network access for downloaded applications can be explicitly changed (increased or decreased) by the end-user to include additional sites on the Internet. End-user control over what a UCVM can connect to may be subject to certain limitations related to corporate networks and sensitive web sites (such as a bank and web mail provider). For example, any code running in a UCVM may not, in general, access any site on a corporate Intranet to which client 200 is connected. Applications that need to connect to the corporate Intranet may need to be signed by the IT administrator of the domain. Similarly, non-web untrusted application code in a general UCVM may not connect to a web site associated with a search engine or bank or other sites that may have been previously identified as being "off limits." These connections can only be made through a web browser (which spawns UCVMs bound to these special domains) or from a special purpose LVM called a VVM, which described in further detail below.

In an embodiment, there is no communication channel available for an application running in one UCVM to communicate with an application running in another UCVM. Thus, applications running in UCVMs are completely isolated from each other and from the other applications in the system. This is well suited for running downloaded third party local applications which are generally designed to be self-contained or for Internet applications (web pages are not supposed to rely on any communication between applications within the web browser). In an alternate embodiment, communication between an identified set of virtual machines can be enabled by a person with sufficient privileges, such as an IT administrator for client 200.

Firewall Virtual Machine

In an embodiment, the implementation of the network access restrictions is done in a dedicated VM called a firewall VM. FIG. 2 depicts an exemplary firewall VM 250 of an embodiment. Firewall VM 250 runs an isolated operating system with a dedicated and fixed set of firewall applications that implement the network access policy for all VMs in client 200 (except perhaps VM0, which may not have any network access). Firewall VM 250 may provide, to any virtual machine running on client 200 in which untrusted code is executed or untrusted data is being interpreted, restricted access to only those network resources deemed necessary on an as-needed basis in accordance with a policy described by policy data stored on client 200.

In another embodiment of the invention, the firewall functionality of the system may be co-located and implemented inside either the hypervisor 220 of FIG. 2, or inside the LVM 240 of FIG. 2 (working in conjunction with the hypervisor 220 of FIG. 2), or inside VM0 230 of FIG. 2 (working in conjunction with the hypervisor 220 of FIG. 2).

Validated Virtual Machines—VVMS

UCVMs are not appropriate to run local applications that interact heavily with each other using local APIs such as COM, as typically there is no communication channel available for an application running in one UCVM to communicate with an application running in another UCVM. Embodiments may employ one (or more) special UCVMs called a Validated Virtual Machine (VVM) for the purpose of running relatively trusted local applications that have complex interactions between the applications. Such complex interactions are common in enterprise frameworks containing multiple applications, such as Microsoft's Office Suite and IBM's Lotus Notes.

FIG. 2 depicts an exemplary VVM 266 of an embodiment. Note that while FIG. 2 depicts a single VVM for ease of explanation, other embodiments of the invention may employ two or more VVMs or no VVMs based upon the particular needs of the user and/or policies of the organization responsible for or the owner of client 200.

Applications need to be signed and configured for co-location in the same VM by an administrator of client 200 before they can run in VVM 266. Inside VVM 266, signed applications can interact with each other using all types of APIs and frameworks supported by the OS being used. In an embodiment, the default network access policy of a VVM is to allow access to a corporate network only. The IT administrator may increase or decrease this level of access, subject to certain restrictions.

In an embodiment, specific signed applications or suites (groups of applications) that originate from a trusted source (other than the enterprise) may also be designated to run together in a particular VVM responsible for applications originating from that source. For example, all non-corporate applications that are signed by a specific vendor may be run together in a single VVM. These applications would then be isolated from corporate applications and general untrusted applications, but not from one another. A specific network access rule that is more permissive than the "same origin policy" used for web applications and unsigned applications may be used for a VVM. The restricted copy of file system 242 exposed to a VVM is similar to that exposed to a generic UCVM in that the restricted copy of file system 242 exposed to a VVM comprises only those files related to, or required for, performance of the applications executing within the VVM.

The Restricted File System Exposed to a VM

Figure 3:
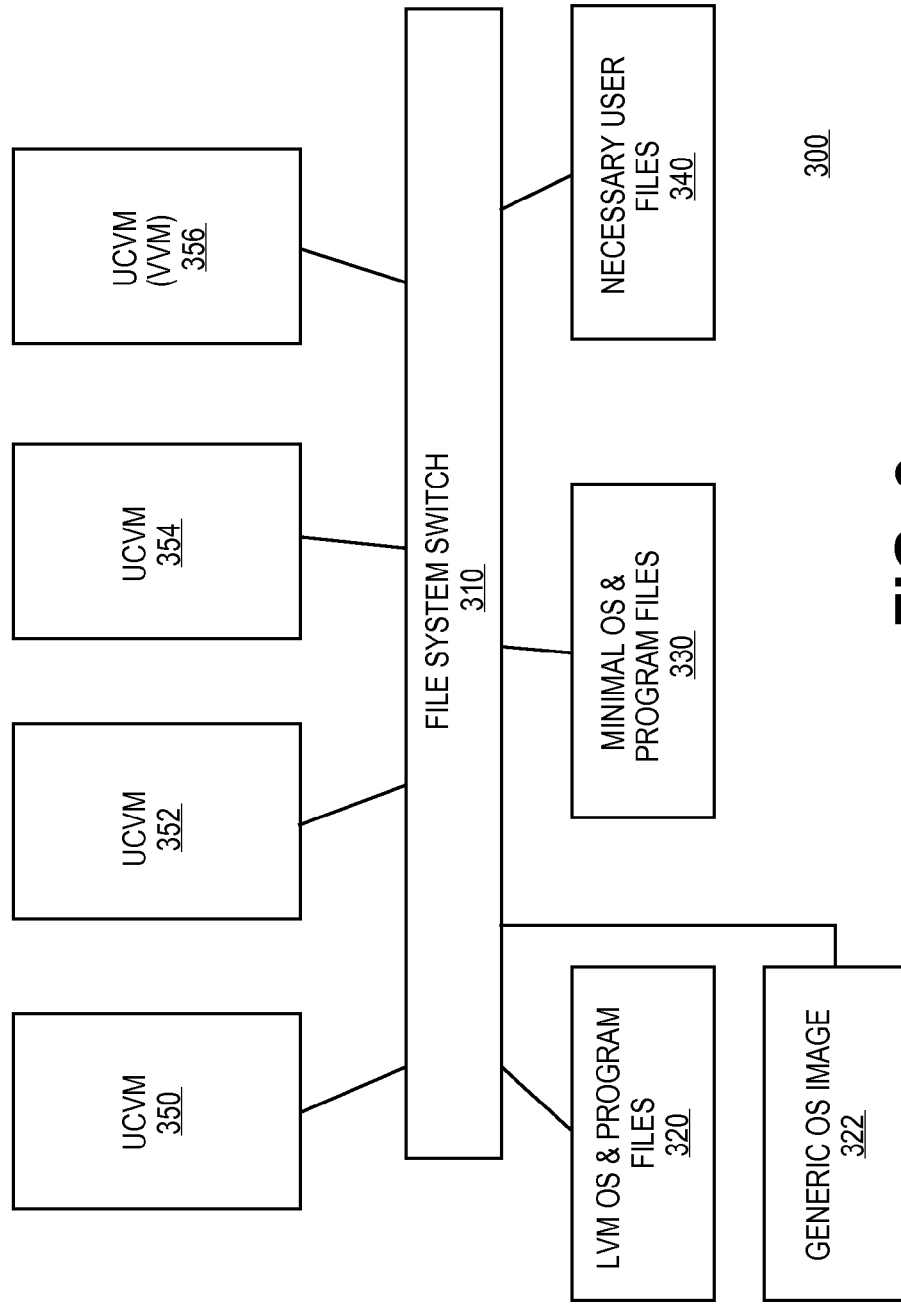
FIG. 3 is block diagram of the functional components involved in exposing a restricted copy of the file system to different UCVMs (and VVMs) according to an embodiment of the invention.

FIG. 3 is block diagram of the functional components involved in exposing a restricted copy of file system 242 to different UCVMs (and VVMs) according to an embodiment of the invention. File System Switch 310 is software that is configured to provide the newly created UCVM with access to a copy-on-write clone of the OS image that the UCVM was created from once the UCVM has started. The minimal operating system and program files 330 in the copy-on-write clone may be created from either the corporate LVM OS image 320 or a separate generic, stripped down OS image 322 which may be created by the IT administrator.

Furthermore, a newly created UCVM is provided a copy of necessary user files 340, which are a subset of the user files in file system 242. The composition of necessary user files 340 will be different for each user. The set of files comprising the user files in file system 242 maintained in LVM 240 are typically those files in the user's home folder, e.g., c:\Users\<username>. The particular copies of files that are provided to a particular UCVM as necessary user files 340 are the minimum set of files that are needed by that UCVM to accomplish what the user intended to do as captured when the target application was being invoked. For example, if the user double clicked on a specific MS Word file named ABC.docx at the location c:\Users\<username>\Documents in the file system 240 maintained in LVM 240, then necessary user files 340 would only include a copy-on-write clone of the ABC-.docx file and only this copy-on-write clone of the ABC.docx file is made available in the virtual c:\Users\<username>\Documents folder made visible to the newly created UCVM running the MS Word application. If a program (like MS Word) was started without any association with a file, then necessary user files 340 would correspond to an empty c:\Users\<username>\Documents virtual folder.

Any application running in a UCVM therefore only has access to the particular set of user files provided explicitly by the user when the program was invoked. Subsequently, if the user wants to browse file system 242 for another file from within the application (for example, by using the File→Open menu item of MS Word), then he or she will see a restricted user files directory.

Figure 4:
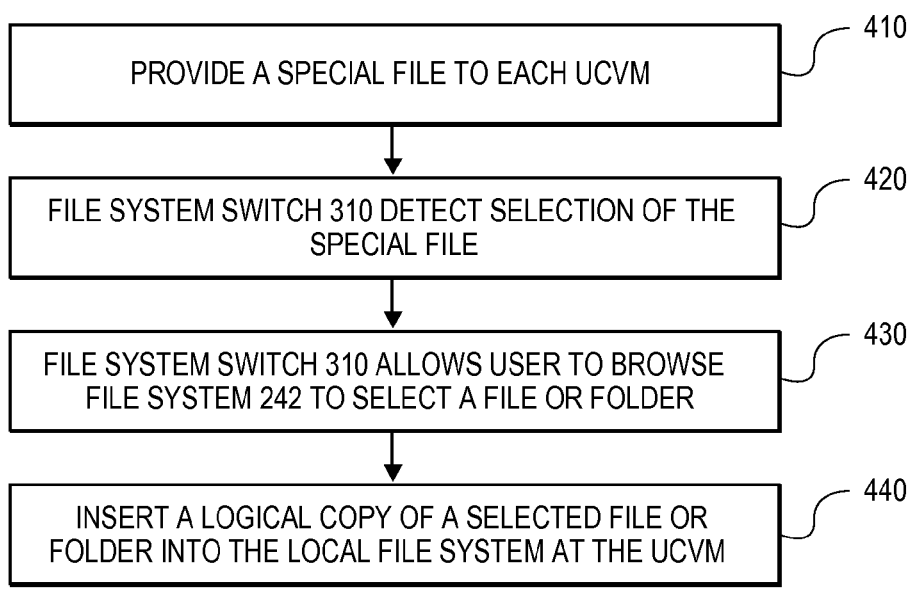
FIG. 4 is a flowchart illustrating the steps involved in a UCVM obtaining a copy of a new user file maintained in the file system stored elsewhere according to an embodiment of the invention.

To enable the user to select files from the user's own User Files folder in file system 242 maintained in LVM 240 using an application executing within an UCVM, a user interface may be provided to allow the user to browse his or her files in file system 242, select one or more of the user files, and expose a copy of the selected files to the appropriate UCVM. For example, FIG. 4 is a flowchart illustrating the steps involved in a UCVM obtaining a copy of a new user file maintained in file system 242 according to an embodiment of the invention. In step 410, a special file is provided to each UCVM. The special file may be provided to the UCVM in a number of different ways, e.g., the special file may be inserted into each folder of the virtual C:\Users\<username>directory provided to each UCVM. This special file may be named something akin to "Show All My Files" or the like, as its selection will be used to trigger exposing additional copy-on-write clones of files stored in file system 242 to the UCVM.

In step 420, File System Switch 310 detects when the special file is selected by the user. For example, when a program executing within a UCVM browses to the special file, presumably as a result of a user click, this action may be trapped by File System Switch 310.

In step 430, File System Switch 310 invokes a dialog with LVM 240 that allows the user to browse the full file system 242 maintained in LVM 240. The user may then select one or more files or folders in file system 242. Note that at this stage, the user may be granted read access to the full file system 242 for purposes of selecting a file or folder, but the user is not granted write access to file system 242. Therefore, the user is prevented from modifying file system 242 maintained by LVM 240 in any way.

In step 440, after the user selects a file or folder, a copy of the selected file or folder is created. The copy of the selected file or folder is then inserted into the restricted file system associated with the UCVM. As a result of inserting the copy of the selected file or folder in the restricted file system associated with the UCVM, an application executing in the UCVM may have read and write access to the copy of the selected file or folder in the virtual file system, but is prevented from effecting any change to the original copy of the selected file or folder in file system 242 maintained by LVM 240. If multiple files or folders are selected in step 430, then in step 440 a copy of each selected file or folder is created and inserted in the restricted file system associated with the UCVM.

The steps of FIG. 4 ensure that files in file system 242 maintained by LVM 240 are not visible to a UCVM without explicit permission from the user. Malicious code running in a UCVM, for example, cannot programmatically access files in file system 242 in LVM 240. Further, malicious code running in a UCVM also cannot render a false user interface to trick the user into unintentionally providing any user files to the malicious code, since all code responsible for rendering the user interface is maintained within VM0 230, and thus, unreachable and un-hackable by the malicious code.

File System Switch 310 may be implemented in a variety of ways. For example, in one embodiment, File System Switch 310 may be implemented by a network file system protocol (NFS or CIFS may be used). A special VM (or LVM 240) may be used as the OS serving the "User Files" shared file system. Other VMs "mount" this shared file system using NFS or CIFS (or another network file system) from the hosting VM. Application software in the hosting VM may decide what files are exposed to which VM based on instructions provided by VM0 230.

In another embodiment, File System Switch 310 may be implemented, in part, by a proprietary protocol for handling communications between the different UCVMs and File System Switch 310. File System Switch 310, in such an embodiment, may be implemented as part of a special VM or in LVM 240.

Cloning a UCVM from a Template

In an embodiment of the invention, every virtual machine created in client 220 is instantiated using a template selected from one or more templates 238 stored in VM0 230. In an embodiment, a template may be either immutable or may be updated in a very controlled fashion.

Each of one or more templates 238 may be used to instantiate or create a virtual machine with different characteristics or operational parameters. The characteristics or operational parameters described by a template may be configured, tailored, or suited for a particular context or type of processing activity. For example, each template may specify what type of code is to be run within a virtual machine created using the template, a size of the virtual machine created using the template, firewall settings for the virtual machine created using the template, what type of virtual machine (for example, a VVM, UCVM, or a LVM) is the be created using the template, how changes to a local file system within the virtual machine created using the template are to be persisted, and what portion, if any, of the network can a virtual machine created using the template access.

One or more devices internal to client 200 or externally connected to client 200 may interact with one or more processes executing in a virtual machine within client 200. In an embodiment, a template may assign responsibility for a selected set of devices to a virtual machine created using the template. In other embodiments, responsibility for a selected set of devices may be assigned to a particular virtual machine by virtue of policy data stored on client 200. Such policy data may describe one or more policies provided to client 200 from an owner or responsible organization of client 200. Policy data of this nature may be maintained by VM0 230 or LVM 240, for example, in certain embodiments.

In an embodiment, one or more templates 238 may be arranged in a hierarchy such that there is a root node corresponding to a template having a default set of characteristics. The root node may have one or more child nodes, and each of these child nodes may be associated with a template that inherits the properties of the parent template, but contains additional or changes properties associated with that child node. Naturally, each child node may also have children, and so the hierarchy of templates may be an arbitrary number of levels deep, where each template inheriting characteristics of its parent, but yet each template is capable of further defining or changing characteristics that distinguishes the template over its parent.

Branches of the hierarchy of templates may be associated with, or more particularly suited, different types of activity. For example, certain templates may be associated with corporate activity, and may therefore specify characteristics related to virtual machines running corporate applications. Similarly, certain templates may be associated with the user's personal application's activity or Internet/Web related activity, and may therefore specify characteristics related to virtual machines running the user's own applications or Internet/Web applications respectively.

Figure 5:
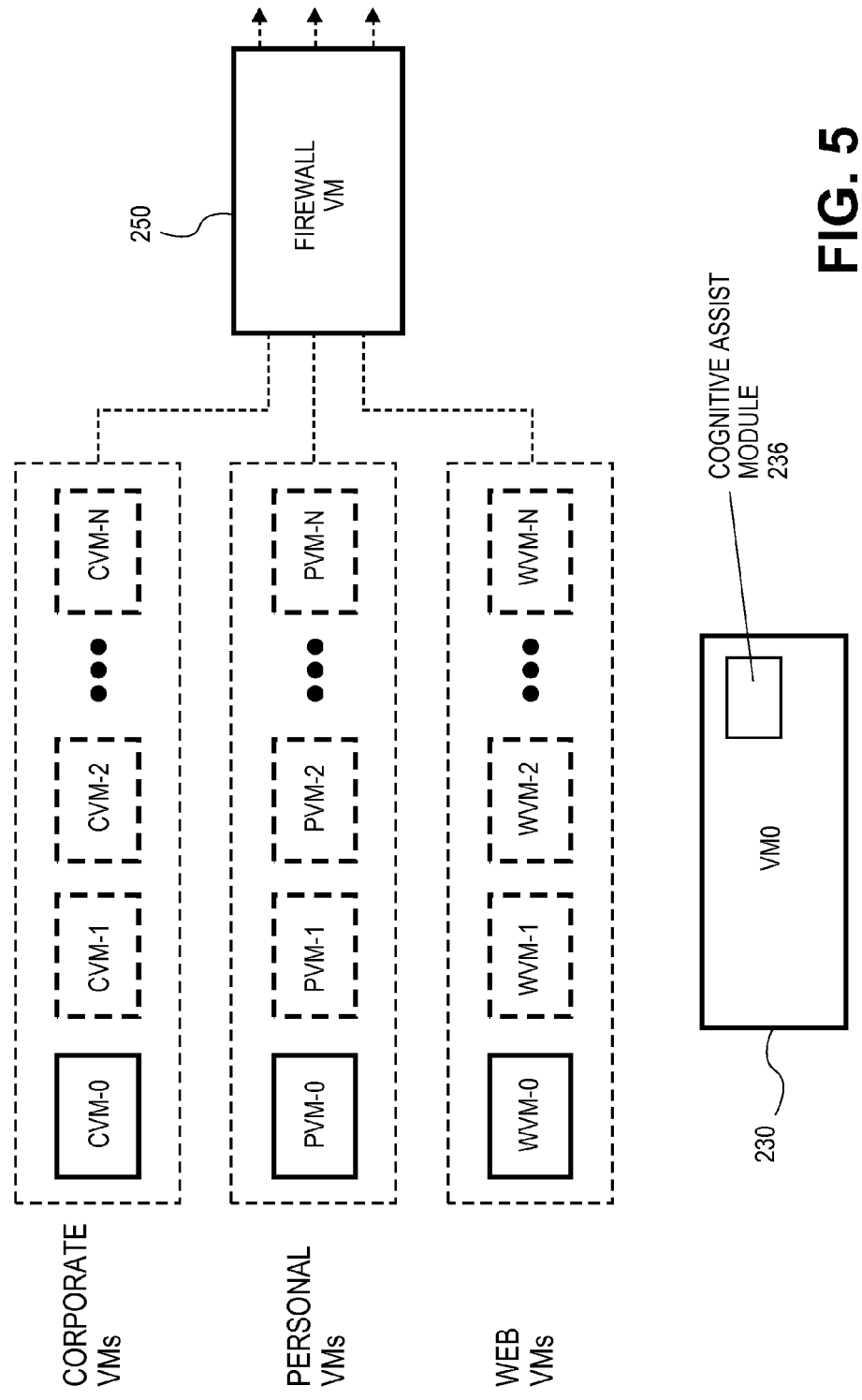
FIG. 5 is an illustration of instantiating a plurality of different virtual machines using different templates according to an embodiment of the invention.

FIG. 5 is an illustration of instantiating a plurality of different virtual machines using different templates according to an embodiment of the invention. In FIG. 5, CVM-0 represents a template that defines a virtual machine having characteristics suitable for running a corporate application, PVM-0 represents a template that defines a virtual machine having characteristics suitable for running a user application (non-corporate), and WVM-0 represents a template that defines a virtual machine having characteristics suitable for running an Internet application. Other embodiments of the invention may define a variety of other templates to define different types of templates. In the example of FIG. 5, cognitive assist module 236 in VM0 230 may use CVM-0 to instantiate one or more corporate virtual machines, such as CVM-1, CVM-2, etc. Similarly, cognitive assist module 236 may use PVM-0 to instantiate one or more personal (non-corporate) virtual machines, such as PVM-1, PVM-2, etc., and cognitive assist module 236 may use WVM-0 to instantiate one or more web-based virtual machines, such as WVM-1, WVM-2, etc. As depicted in FIG. 5, each instantiated UCVM connects to an external network through Firewall VM 250. Cognitive assist module 236 can either create these templates on demand or create and store them while monitoring the usage of the client.

Installation of Software

After-market software is typically installed on a computer system. Such after-market software generally falls into one of two categories, namely (a) validated software (packages or straight executables) installed by the IT administrator or (b) end-user installed software (including web browser plug-ins & extensions).

In embodiments of the invention, installation of validated software is performed as is normally performed today. The IT administrator can manage corporate validated software using embodiments using similar procedures as performed today, except that such corporate validated software are installed in LVM 240 (or if need be, VVM 266).

With respect to end-user installed software, IT administrators have two choices for how they would like to handle this type of installation using embodiments of the invention. The first choice is for the IT administrator to lock down client 200 by disallowing any installation of end-user installed software. While this is a safer operating decision, this approach may reduce the end-user's productivity because the end user cannot take advantage of applications that may be otherwise useful that have not yet been validated by the IT administrator. The IT administrator may provide installation support on an individual and as-needed basis whenever a user wishes to install any end-user installed software; however, doing so will increase the cost of support by the IT administrator.

The second choice is for the IT administrator to allow the user to install end-user installed software him or herself using features provided by embodiments of the invention. End-user installed software may include browser plug-ins, browser extensions, signed and unsigned installation packages, and straight executables. Browser plug-ins are installed into an installed browser plug-in database that is maintained in a particular UCVM. The installed browser plug-in database may be implemented, in an embodiment, using file and registry diff store 820 shown in FIG. 8, which is an illustration of safely installing an untrusted application according to an embodiment of the invention of the invention. During installation of a plug-in, the installed browser plug-in database is also updated to record the domain that was used to initiate the plug-in install. Presumably, this is the web page that contains an element or component that requires the plug-in to render the complete content in the web page. Subsequently, the web browser loads an installed plug-in into a web HTML/JS engine instance (which runs inside a UCVM) only if the domain of the web page to be displayed by the UCVM matches a domain, recorded in the plug-in database, associated with the installed plug-in. A plug-in that is used by multiple sites is installed only once, but is associated with multiple domains. Popular plug-ins like Flash may be pre-installed in certain embodiments.

Browser extensions may be installed into a web browser's extension database that is maintained in a particular UCVM. During runtime, browser extensions are treated like web applications in that each browser extension is run inside its own UCVM. In an embodiment, the web browser extension database and the installed browser plug-in database may be implemented in the same database in a single UCVM.

Signed installation packages may be run and the resulting installation may update either the LVM image or the Generic Windows image based on a policy set by the IT administrator.

Figure 8:
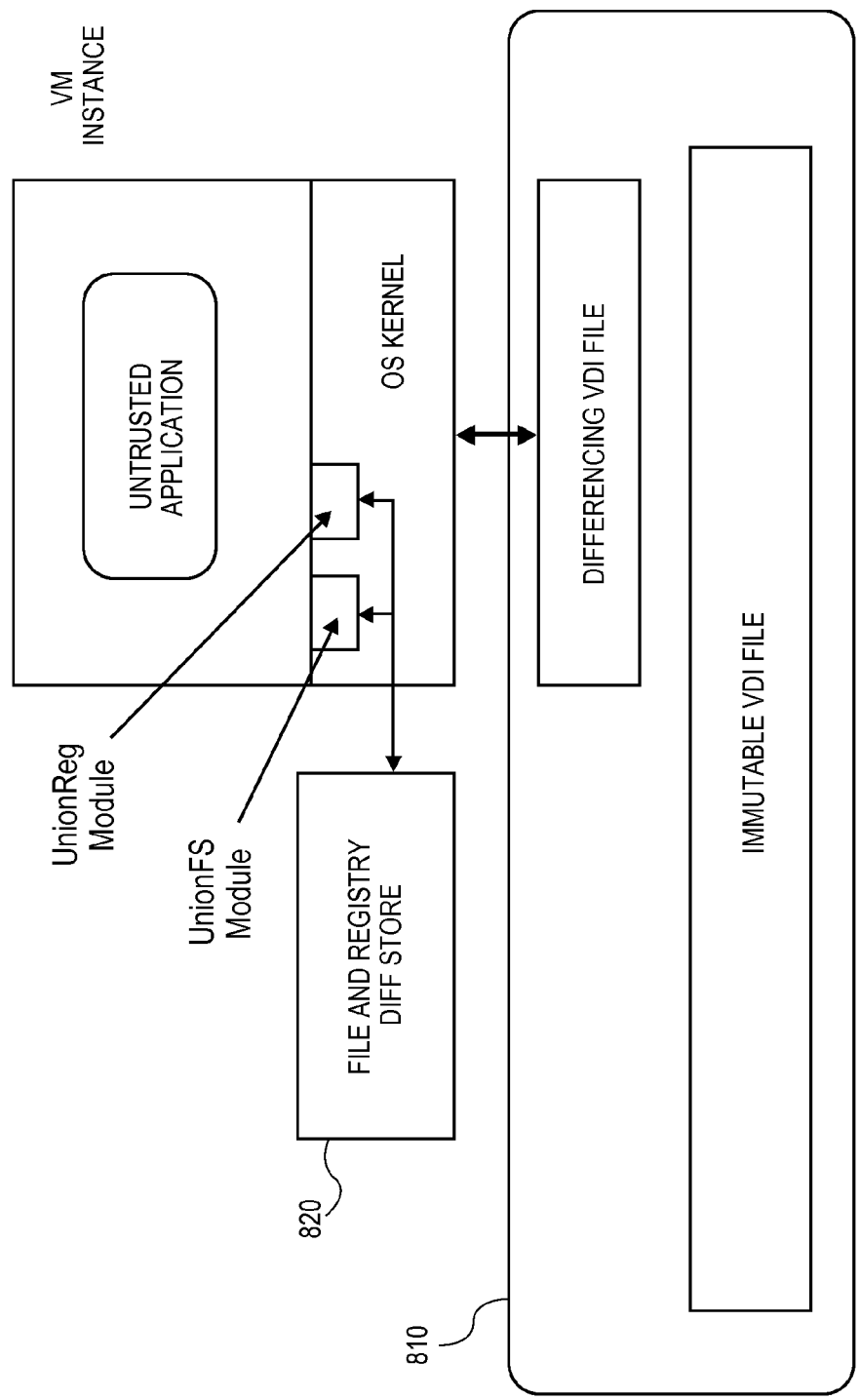
FIG. 8 is an illustration of safely installing an untrusted application according to an embodiment of the invention of the invention.

Unsigned installation packages go through a virtual install. The virtual installation of unsigned installation packages will be described with reference to FIG. 8, which is an illustration of safely installing an untrusted application according to an embodiment of the invention of the invention. A registry and program files change set is created and stored in file and registry diff store 820. Start-menu and desktop changes by the installer are captured in a special folder which contains desktop and start menu items for all user-installed applications. Subsequently, if an unsigned application is run, it is run in a UCVM cloned from the Generic Windows image all by itself. Virtual disk 810 in FIG. 8 is the normal virtual disk of the UCVM. DiffStore 820, which further virtualizes the file system and the registry as seen by the applications of UCVM, is typically implemented as a separate module outside of the normal block level virtual disk store.

Signed and unsigned executables may be run in a UCVM. Such a UCVM may be created on demand and destroyed after its use is ended by embodiments.

Managing Web Cookies and Caches

A web cookie (or simply "cookie") is a piece of text stored on a user's computer by their web browser. A cookie can be used for authentication, storing web site preferences, shopping cart contents, the identifier for a server-based session, or anything else that can be accomplished through storing text data.

While the actual cookie itself is not visible to the user, the user would notice a difference in the user experience of interacting with a web site if cookies could not be saved between visits to the web site. Accordingly, embodiments of the invention provide mechanism to store cookies before a UCVM is destroyed, so that the next time the user visits the web site using a web browser running in a different UCVM, any cookies that have been stored and are associated with that web site may be injected into the new UCVM.

Similarly, to provide the best user experience, it would be advantageous to carry over the cache of a web browser for a particular web domain from one UCVM to the next, so that the next time the user visits the web domain using a different UCVM, there is no a delay in displaying content due to an unpopulated cache. Thus, embodiments of the invention provide mechanism to store the web cache of a web browser for a web domain before a UCVM is destroyed, so that the next time the user visits the web site using a web browser running in a different UCVM, the cache of the web browser need not be warmed (i.e., repopulated), as the cache in the new UCVM has been updated to contain all the objects the cache previously contained in the prior, and now destroyed, UCVM used to visit the web domain.

To provide a concrete example with reference to the example of FIG. 2, assume that a user initially transparently uses UCVM 260 to run a web browser to visit web site A. When UCVM 260 is destroyed, any cookies and cache files are extracted and saved. Thereafter, assume the user transparently uses UCVM 262 to run a web browser to visit web site B. As web site B is hosted by a different web domain than web site A, the previously stored cookies and cache files associated with web site A will not injected into UCVM 262. Thereafter, if UCVM 262 is destroyed, then any cookies and cache files are extracted and saved. At a later point in time, if the user thereafter transparently uses UCVM 264 to run a web browser to visit web site A, then the previously stored cookies and cache files associated with the web domain of web site A will be injected into UCVM 264. This allows the web browser running in UCVM 264 to visit web site A to appear, to the user, to have the same state of the prior web browser used to visit web site A, even through different virtual machines are used between visits. Note that no portion of the file system is saved between visits to a web site; only the state of the web session is saved.

In one embodiment, the cookies and cache information is captured in Diff Store 820 associated with the URL of the website. In each visit to the same URL, the UCVM utilizes the same Diff Store presenting the cookies and caches to the UCVM. In another embodiment, the cookies and cache files can be captured at the end of the session and saved to the client system's core file system in a special folder. On visiting the same URL again, the cookies and cache can be re-injected into the file system of the UCVM.

Efficient Physical-to-Virtual Disk Conversion

Platform virtualization is performed on a given hardware platform by host software (a control program), which creates a simulated computer environment, termed "a virtual machine," for its guest software. A hypervisor, also called virtual machine manager (VMM), is one of many hardware virtualization techniques that allow multiple operating systems, termed "guests," to run concurrently on a host computer. The hypervisor presents to the guest operating systems a virtual operating platform and manages the execution of the guest operating systems. A guest OS executes as if it was running directly on the physical hardware. Access to physical system resources such as the network access, display, keyboard, and disk storage is suitably virtualized so that a guest OS does not know that these are virtual devices.

Generally, there are two types of hypervisors. Type 1 (or native, bare metal) hypervisors run directly on the host's hardware to control the hardware and to manage guest operating systems. A guest operating system thus runs on another level above the hypervisor. Type 2 (or hosted) hypervisors run within a conventional operating system environment. With the hypervisor layer as a distinct second software level, guest operating systems run at the third level above the hardware. In other words, Type 1 hypervisor runs directly on the hardware; a Type 2 hypervisor runs on another operating system, such as Windows. Embodiments of the invention may use any type of hypervisor. Thus, hypervisor 220 in FIG. 2 may either be a Type 1 or a Type 2 hypervisor.

A virtual disk image (or simply "a virtual disk") is a file on a physical disk, which has a well-defined (published or proprietary) format and is interpreted by a hypervisor as a hard disk. A virtual disk image may have a specific file type extension, e.g., .vmdk for VMware VMDK, .vhd for Xen and Microsoft Hyper-V, and .vdi for Oracle VM VirtualBox.

There are two approaches employed for storage allocation by prior hypervisors, namely, (1) pre-allocate the entire storage for the virtual disk upon creation and (2) dynamically grow the storage on demand. In the former approach involving pre-allocation, the virtual disk may be implemented as either split over a collection of flat files (typically one is at least 2 GB in size) or as a single, large monolithic flat file. In the latter approach involving on-demand growth, the virtual disk may also be implemented using split or monolithic files, except that storage is allocated on demand.

There are two modes in which a disk can be mapped for use by a virtual machine. In a virtual mode, the mapped disk is presented as if it is a logical volume, or a virtual disk file, to the guest operating system and its real hardware characteristics are hidden. In a physical mode, also called the pass through mode, the hypervisor bypasses the I/O virtualization layer and passes all I/O commands directly to the disk.

A virtual machine (VM) is a software implementation of a machine (i.e. a computer) that executes programs like a physical machine. Virtual machines allow the sharing of the underlying physical machine resources between different virtual machines, each running its own operating system. The software layer providing the virtualization is called a hypervisor, such as hypervisor 220 in FIG. 2.

Virtual machines each require their own image of the operating system. The guest OS and host OS typically do not share the OS image, even if they are the same OS. This is problematic for several reasons. First, if a user wishes to run 10 different virtual machines, then she will require 10 different copies of the OS for the guest OSs, which requires an undesirable amount of storage to maintain. Second, the OS for a VM has to be created either by installing a new OS or shipping a copy of the OS from somewhere else, which is burdensome for those who do not have access to OS images. Further, it is also time consuming to install a new OS or ship an OS image, which is typically quite large. A third problem is that any software present in the host OS (such as a printer driver) will not be available in a guest OS unless it is installed again.

Figure 6:
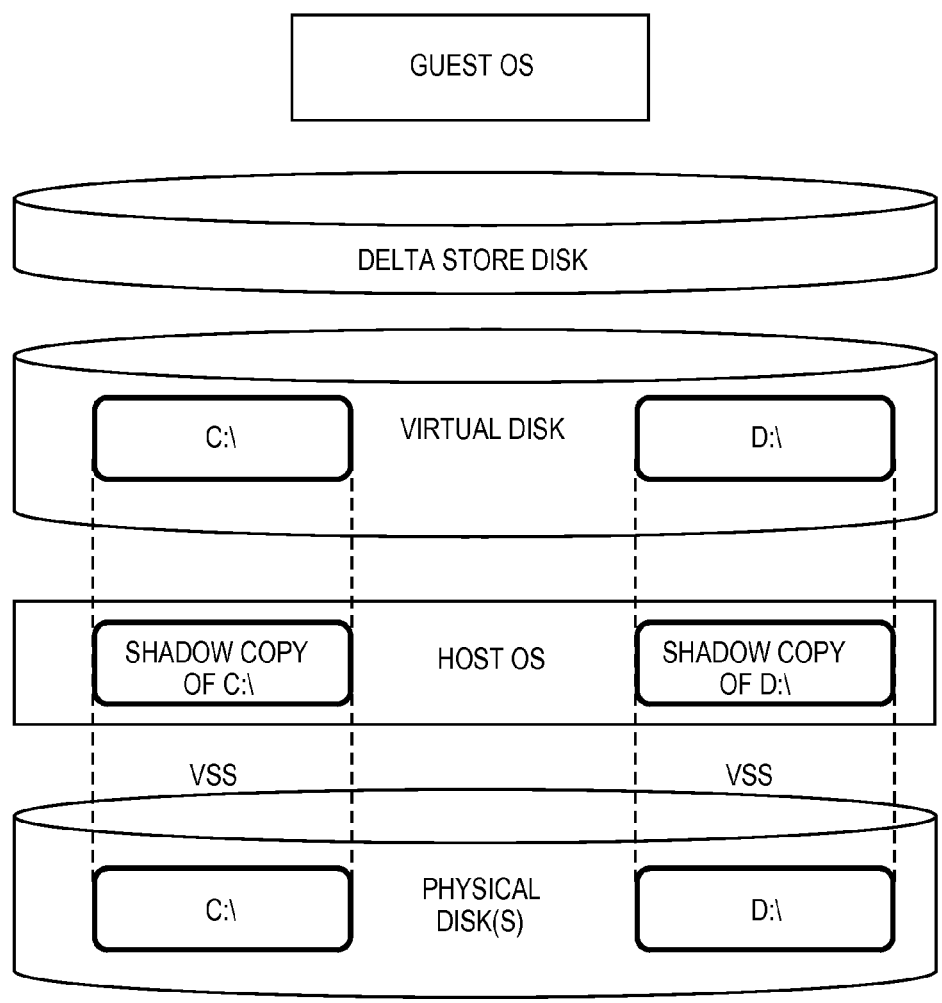
FIG. 6 is an illustration of a virtual disk based on VSS shadow copies according to an embodiment of the invention.

Embodiments of the invention enable a guest operating system to be provided to a virtual machine in a manner that overcomes the disadvantages of the prior art, such as requiring a separate operating system to be installed for each virtual machine. FIG. 6A is an illustration of a virtual disk stack according to an embodiment. FIG. 6A depicts a virtual disk stack comprising one or more physical disks 610 upon which a host operating system 620 is installed. Virtual disk 630 is a physical file stored on one or more physical disks 610 that is interpreted by a virtual machine as a physical disk.

The illustration of FIG. 6A will be referenced below in the discussion of FIG. 6B, which is a flowchart illustrating the functional steps of providing a guest operating system to a virtual machine according to an embodiment of the invention. In an embodiment, the guest operating system provided to a virtual machine is read by the virtual machine from virtual disk 630. It is noted that each step of FIG. 6B may be performed programmatically, i.e., each step of FIG. 6B may be performed by a software entity.

In step 660 of FIG. 6B, a physical disk that contains a system partition and a boot partition is identified. The physical disk containing the system partition and the boot partition may be one of the one or more physical disks 610 in FIG. 6A. As used herein, a system partition is a disk partition that contains the operating system files. For example, in a Microsoft Windows environment, the disk partition would contain the Windows operating system files (e.g., the Windows directory). As used herein, a boot partition is the disk partition that contains the bootloader. The boot partition may be identified by an API call and an examination of the BootIndicator flag, while the system partition may be identified by an examination of environment variables. The system partition may be, but need not be, different from the boot partition, although they are often on the same partition (such as drive C:).

A system partition may be identified by examining the drive letter of a volume on which host operating system 620 is installed using an exposed API. Alternately, the system partition may be identified by examining certain environment variables, such as SystemDrive, SystemRoot, or WinDir, for example. Boot partitions may be identified using an exposed API, e.g., by examining a BootIndicator field of the partition layout data structure using the Windows API.

In step 662, information about the physical layout of the one or more physical disks 610 is obtained. To illustrate, in performing step 662, information identifying a list of partitions on the one or more physical disks 610 may be determined.

In step 664, certain partitions of the one or more physical disks 610 are mapped to a set of volumes to be included in virtual disk 630. In step 664, each volume that is going to be included in virtual disk 630 is mapped to a partition on one or more physical disks 610 so that the exact starting offset and the size for each volume to be included in virtual disk 630 is known.

In step 666, a determination is made as to whether any additional volumes should be included in the set of volumes that are to be included in virtual disk 630. Digital content such as program files and user files may be stored in a variety of locations. If the location where such program files and/or user files are stored is on a different volume of a physical disk other than those identified in step 664, then this volume should be included in virtual disk 630. Such locations may be identified using a variety of different means, e.g., by examining system environment variables such as ProgramFiles, ProgramData, or UserProfiles, or by querying an operating system API.

In step 668, a read-only copy of the set of volumes to be included in virtual disk 630 is created. After creation, the read-only copy of the set of volumes is stored on one or more physical disks 610.

In one embodiment, the read-only copy of the set of volumes to be included in virtual disk 630 may be created using a Shadow Copy. Shadow Copy (Volume Snapshot Service or Volume Shadow Copy Service or VSS) is a technology included in Microsoft Windows that allows taking manual or automatic backup copies or snapshots of data (termed "shadow copies") on a specific volume at a specific point in time over regular intervals. The Volume Shadow Copy Service operates at the block level of the file system.

Shadow copies allow for the creation of a consistent backup of a volume, ensuring that the contents cannot change while the backup is being made. Thus, shadow copies avoid problems with file locking By creating a read-only copy of a volume, backup programs are able to access every file without interfering with other programs writing to those same files. Shadow copies may be created regardless of what locks are present on data within a volume. VSS enables integral backups that are point in time and application level consistent without the backup tool having knowledge about the internals of each application. The end result is similar to a versioning file system, allowing any file to be retrieved as it existed at the time any of the snapshots was made.

In step 670, a copy of the master boot record (MBR) for the set of volumes to be included in virtual disk 630 is stored. The MBR is a type of boot sector. Embodiments may be used with a wide variety of MBRs and are not limited for use with one type of MBR. For example, the copy of the MBR stored in step 670 may correspond to a Basic or Dynamic Disk with either MBR or GUID style partitioning. The MBR contains a partition table and code for initiating the booting process of host operating system 620.

A MBR cannot be shadow copied, and so in an embodiment it is contemplated that in step 670 a physical byte-to-byte copy is created and stored on one or more physical disks 610. The copy of the MBR may be stored in association with the read-only copy of the set of volumes made in step 668. The size of the MBR may be determined as an offset of the first partition of one or more physical disks 610, which may be larger than necessary, but avoids the concern about missing any data stored in this drive space by OEMs. Note that certain embodiments may configure the MBR copy to omit entries for partitions which are not relevant to the virtual machine template, e.g., the OEM recovery partition. Such configuration of the MBR copy may be performed by mapping zeros over the entries or by omitting the virtual disk extents mapping this area of the physical disk.

In step 672, virtual disk 630 is created based on the read-only copy of the set of volumes and the MBR stored in step 670. In an embodiment, virtual disk 630 is a file, physically stored on one or more physical disks 610, that conforms to a well-defined (published or proprietary) format which allows the file to be interpreted by a hypervisor as a hard disk.

In the VMDK file format, virtual disks can be described as a set of extents, which are a contiguous set of disk sectors. A particular extent of a virtual disk can be mapped to a variety of different storage devices, such as hard-drive device, a volume device, or a file on a host file system, to name a few examples. To access the shadow copy created by VSS, a VDMK extent is mapped to a device using the device name that VSS assigns to that particular shadow copy. For example, a typical VMDK may indicate an extent from sector 0 to sector 2047 is mapped to win7.mbr on a local file system, an extent from sector 2048 to sector 2000000 is mapped to VSS shadow copy device \\?\GLOBALROOT\Device\HarddiskVolumeShadowCopy8, and an extent from sector 2000001 to 2000002 is ZERO (the virtual machine will interpret these sectors as empty if they are accessed).

In VMDK, one cannot specify a particular extent's offset—only the size can be specified. Thus, to match the layout of a physical drive being virtualized, the extent that corresponds to a volume on a physical disk that was not considered worthless to be made accessible in a virtual machine, still needs to be present in the VMDK description; however, the type of such extent will be specified as ZERO to indicate that this extent occupies the space but is not mapped to any storage device.

Another situation when a ZERO extent may be used by an embodiment is when the operating system uses some sectors in the end of a partition for its own purposes. In this case, the size of the partition reported by the operating system API will be N, but the offset of the next partition will be N+X, where X is the amount of sectors reserved by the operating system. A ZERO extent of size X may be specified in the VMDK description of the virtual disk to account for this difference, as shall be explained below.

According to one embodiment, for any volumes in virtual disk 630 which had a corresponding read-only copy (such as a shadow copy) created in step 668, the volume in virtual disk 630 is described as a read-only extent having a type of FLAT and which references the corresponding read-only copy. For example, the boot and system volumes in virtual disk 630 may be implemented as a read-only extent have a type of FLAT and which references the corresponding read-only copy. For any other volume in virtual disk 630 which did not have a corresponding read-only copy (such as a shadow copy) created in step 668, the volume in virtual disk 630 is described as a read-only extent having a type of ZERO.

In an embodiment, if the partition start offset of virtual disk 630 is greater than an offset calculated by the partition start offset and size of the partition identified in step 660, then the different is accounted for using an extent. In such a case, a read-only extent is created that has a type of ZERO and a size equal to the difference between the partition start offset of virtual disk 630 and the calculated offset.

Advantageously, virtual disk 630 of FIG. 6A allows for many guest OSs running on the same host to share the same installed copy of an operating system as the host OS. To illustrate, as shown in FIG. 6A, guest OS 650 and 652 may each access virtual disk 630. Virtual disk 630, in turn, may contain a copy of host OS 620. However, virtual disk 630 is constructed using a single copy of an operating system that is physically stored and installed upon one or more physical disks 610. Thus, virtual machine 654 and virtual machine 656 may each execute a guest OS without the need to install a new operating system for those virtual machines.

VSS shadow copies may be created fast and efficiently. Thus, in an embodiment employing VSS shadow copies, the read-only copies of the one or more volumes created in step 668 is performed quickly and efficiently. Also, the creation of virtual disk 630 using the read-only copy of the one or more volumes is also a very fast operation. As a result, virtual machines (having a guest operating system of the same type as the host operating system) can be created very quickly and efficiently.

Shadow copies may also be maintained cheaply by certain operating systems, such as the MS Windows, by maintaining data about the changes made to a volume since the time a shadow copy was made for that volume. Hence, the disk usage of multiple virtual machines may be reduced substantially.

Since a VSS shadow copy contains all the software the user has installed on the machine at the time of the creation of the VSS shadow copy, virtual disk 630 that is created using a VSS shadow copy also receives access to all the software present in the VSS shadow copy. Moreover, the version of the software, including any patches installed, is exactly the same as in the original volume being shadow copied. In addition, user documents present in the original volume being shadow copied are also present in virtual disk 630, and therefore, visible to virtual machines which perform read operations against virtual disk 630. Thus, virtual disk 630 of an embodiment is an accurate point-in-time copy of host physical disk.

Security Afforded by Embodiments

Embodiments of the invention provide a secure environment to prevent malicious code from affecting any lasting change in a computer system. Untrusted code (either a web application or a native executable) runs inside an isolated operating system running on an isolated virtual machine. This code has no access to any other application (either a native application or a web application) being run by the user because those applications run in other operating systems running in separate virtual machines. Moreover, untrusted code has access to only the specific part of the file system that is needed for correct execution of the code. Access to additional parts of the file system has to be provided by code that runs in VM0 (which is secure and fortified against unauthorized intrusion) and any increased access needs explicit authorization from the human user.

Specific trusted code that needs to interact in a complex way with other applications may be explicitly designated to run together inside the same designated VM. This type of VM also has limited access to the file system.

All code has limited network access to just what that code needs for its correct execution. All virtual machines are created from templates stored in VM0 which are either immutable or can be updated in a very controlled fashion. Consequently, if a security bug exists in a piece of code, the effect of the security bug is isolated ("space limited") because the compromised code has access to only a limited part of the file system, the network, devices, etc. Moreover, the effect of the security bug is "time limited" because the virtual machine that has been compromised will be subsequently discarded and a new virtual machine is created for future application instances from a clean immutable VM template.

Reducing Memory Requirements of Guest Operating Systems

Memory needs to be carefully managed when a client executes multiple virtual machines. To reduce the amount of memory required to execute each virtual machine, embodiments employ techniques that take advantage of similarities across virtual machines.

Modern computer systems use a memory management technique, called virtual memory, which supports a large number of virtual addresses which can be used to reference more memory than is actually present in physical memory. A component of a guest operating system may map each virtual address to a particular page of memory, within a guest physical frame, which is identified by a guest physical frame number (GPFN). A guest physical frame number (GPFN) identifies a particular page in memory, within a guest physical frame, that will be used by a particular guest operating system. Note that multiple virtual addresses may map to the same page of memory, and not all virtual addresses are necessarily mapped. FIG. 10 is an illustration depicting a prior art approach of mapping virtual addresses to guest physical frame numbers.

An additional level of translation is required to support memory operations involving executing a virtual machine. This mapping is performed by the hypervisor and involves mapping each guest physical frame number (GPFN) to a machine frame number (MFN). A machine frame number (MFN) identifies a particular page in physical memory.

FIG. 11 is an illustration of the mapping, maintained by a hypervisor, between guest physical frame numbers (GPFNs) and machine frame numbers (MFNs) according to an embodiment. While only four GPFNs and four MFNs are shown in FIG. 11 for clarity, those skilled in the art recognize many more GPFNs and MFNs may be comprised within a practical embodiment. As shown in FIG. 11, each GPFN is mapped to a particular MFN using a GPFN-MFN pointer. A GPFN-MFN pointer is data that identifies that a particular GPFN maps to or references a particular MFN. For example, GPFN 1110 is mapped to MFN 1120 via GPFN-MFN pointer 1130, GPFN 1112 is mapped to MFN 1126 via GPFN-MFN pointer 1132, GPFN 1114 is mapped to MFN 1122 via GPFN-MFN pointer 1134, and GPFN 1116 is mapped to MFN 1124 via GPFN-MFN pointer 1136.

Data about all GPFN-MFN pointers is maintained in mapping table 1155 of hypervisor 1150. Mapping table 1155 is a data structure that stores data identifying all GPFN-MFN pointers and their characteristics. An illustrative characteristic of a GPFN-MFN pointer 1155 is whether the GPFN-MFN pointer is a read link or a read/write link. Read links and read/write links shall be described in further detail below. In an embodiment, each time that a virtual machine is created, hypervisor 1150 creates a new mapping table to be used by the newly created virtual machine. In other words, two different virtual machines would not use the same mapping table, but instead, would use their own mapping table.

Using the mapping shown in FIG. 11, a guest operating system may read a page of memory using a GPFN. If a guest operating system desires to read the page of memory at GPFN 1112, then the guest operating system, in communication with the hypervisor, understands that the contents of page of memory at GPFN 1112 is located at MFN 1126. Similarly, the content of the page of memory at GPFN 1110 is interpreted to be the same as the content of the page of memory at MFN 1120, and so on.

It is observed that different virtual machines typically require many of the same pages in memory. In recognition of this observation, embodiments of the invention enable guest physical frame numbers (GPFN) in different virtual machines to map to the same machine frame number (MFN). This flexibility significantly decreases the amount of pages which need be maintained in memory to support multiple virtual machines.

Figure 12A:
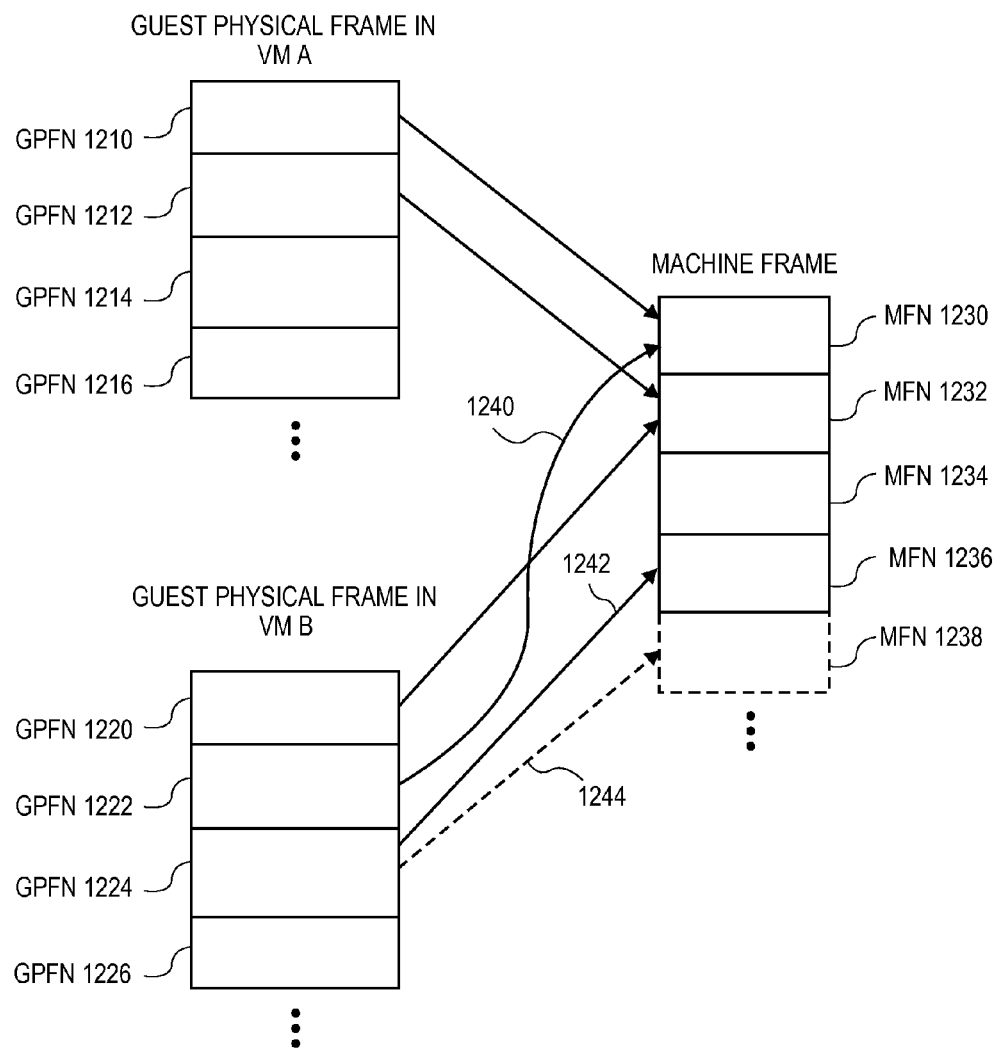
FIG. 12 is an illustration of the mapping between guest physical frame numbers and machine frame numbers for two different virtual machines according to an embodiment of the invention.

To illustrate a concrete example, consider FIG. 12A, which is an illustration of the mapping between guest physical frame numbers and machine frame numbers for two different virtual machines according to an embodiment. FIG. 12A depicts guest physical frame numbers for virtual machines VM A and VM B. In FIG. 12A, guest physical frame numbers in different virtual machines are mapped to the same machine frame number. For example, the page at GPFN 1210 in VM A and the page at GPFN 1222 in VM B are each mapped to the page at MFN 1230. Note that GPFN 1210 in VM A has a different frame number (i.e., they are located in different positions within the sequence of GPFNs) as well as resides in a different virtual machine as GPFN 1222 in VM B.

In FIG. 12A, a GPFN is mapped to a MFN using a GPFN-MFN pointer. A GPFN-MFN pointer may either be a read link or a read/write link. If GPFN-MFN pointer 1240 is a read link, then the guest operating system executing in VM B would be able to read the page of memory at MFN 1230 using GPFN 1222, but would not be able to write to that page using GPFN 1222. On the other hand, if GPFN-MFN pointer 1240 is a read/write link, then the guest operating system executing in VM B would be able to read and write to the page of memory at MFN 1230 using GPFN 1222.

In an embodiment, a GPFN-MFN pointer is only allowed to be of type read/write if the MFN referenced by that GPFN-MFN pointer is referenced by no other GPFN-MFN pointer in another virtual machine. In this way, each virtual machine may be ensured that another virtual machine cannot write over the memory pages which it is referencing.

At some point, a virtual machine will need to write to a page of memory. Assume that a guest operating system desires to write to the page of memory at GPFN 1224. Further assume that (a) the mapping table maintained by the hypervisor indicates that GPFN 1224 maps to the page of memory at MFN 1236 via GPFN-MFN pointer 1242 and (b) GPFN-MFN pointer 1242 is a read link. Since GPFN-MFN pointer 1242 is a read link, the requested write operation will be temporarily halted so that a new page of memory may be allocated. This newly allocated page of memory is depicted in FIG. 12A as the page at MFN 1238. The mapping table maintained by the hypervisor is then updated to remove GPFN-MFN pointer 1242 and add GPFN-MFN pointer 1244, which is established as a read/write link. As a result, GPFN 1224 now maps to the newly allocated page at MFN 1238. The write operation may then be performed against the page of memory at MFN 1238 since GPFN-MFN pointer 1244 is a read/write link. Since GPFN-MFN pointer 1244 is a read/write link, if a write operation is subsequently requested to be performed against the page of memory identified by GPFN 1224, the write operation may be performed against the page of memory at MFN 1238, as writing to the page of memory referenced by a read/write link is permitted. Note that all read/write access to GPFN 1224 will be directed to MFN 1238 and that MFN 1238 is now private for GPFN 1224 on VM B.

Figure 12B:
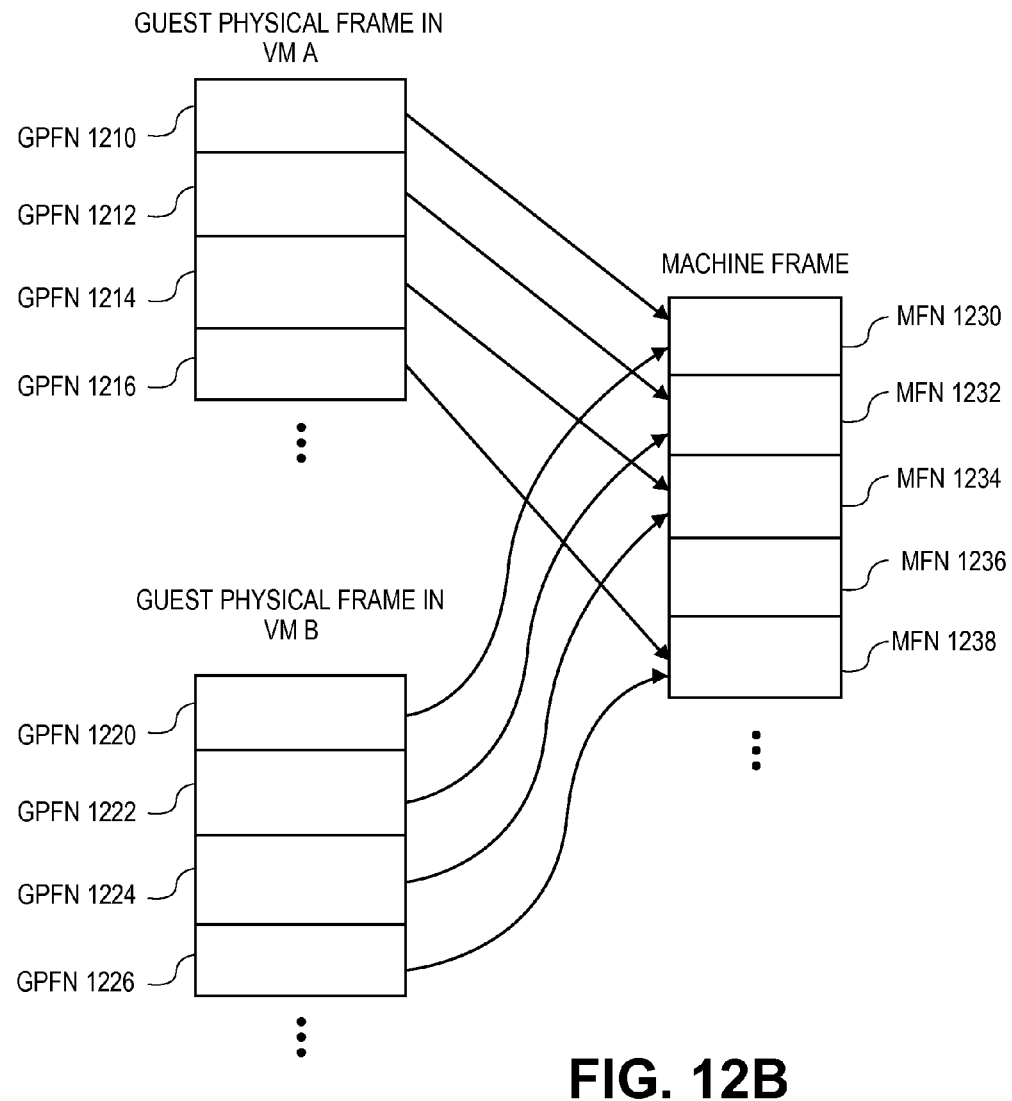

FIG. 12B is an illustration of the mappings between guest physical frame numbers and machine frame numbers for two different virtual machines, where one is a template VM, according to an embodiment. In an embodiment, a virtual machine may be configured to operate as a template VM. A template VM will be used in the creation of other virtual machines using the copy-on-write process as described above. In particular, the guest physical frame of a newly created virtual machine will be created using the guest physical frame of the template VM using a copy-on-write process. A template VM may be paused such that there are no active processes within the template VM, but this need not be the case in every implementation. As shown in FIG. 12B, VM A is a template VM.

In an embodiment, the pages in memory for a template VM are used as basis for cloning the memory pages for other virtual machines using a copy-on-write process. Thus, when a new virtual machine is instantiated from a template VM, the newly instantiated VM does not consume any additional pages in memory to represent memory for the guest (although additional host memory to represent the new VM would still be required). Immediately after creating the new VM, the guest physical frame numbers of the newly instantiated VM each refer to the same machine frame numbers as the guest physical frame numbers of the template VM, and so no additional memory is required to store data about the GPFNs of the newly instantiated VM. As pages of the newly instantiated VM start to diverge from the memory pages of the template VM, the newly instantiated VM will start to consume memory to store the diverged pages. Therefore, it is desirable to minimize the number of pages in a VM that diverge from the template VM used to create it. Approaches shall be presented herein for minimizing such divergence, such as the technique discussed in the next section for handling free pages.

Handling Free Pages

As a guest operating system writes to pages of memory, the pages of memory used by that virtual machine will diverge from the memory pages of the template VM used to create the virtual machine. As diverged pages of memory require additional memory to be allocated, it is desirable to minimize the number of diverged memory pages in each virtual machine.

As the applications and operating system with a guest VM execute they will write to memory causing memory to diverge. At some later point, an application may terminate or memory pages that were previously in use may no longer be required. The operating system typically puts such pages on a "free list" where they will be zeroed by the operating system kernel and placed on the "zero list" so that they may be used to satisfy subsequent memory allocation requests. Pages that are sitting on the free list or zero list do not contain useful data, and hence, it is desirable that we be able to update the hypervisor mapping tables such that all of these pages become mapped to a single page containing zeroes (one that might be shared across all guests), freeing the original machine pages for subsequent reuse by the hypervisor.

One approach for minimizing the number of diverged memory pages in each virtual machine involves "zeroing" any free pages in the guest physical frame without periodic scanning of pages in memory, allowing pages to be "zeroed" more quickly and efficiently than prior approaches. As used herein, "zeroing" a memory page refers to the act of causing the contents of a free memory page to be interpreted as a set of default content. The set of default content may be, and typically is, all "zero" values, hence the name. A free page is any page in memory which is included on a list of free pages maintained by the operating system. In addition the list of free pages, each guest operating system also maintains a list of "zeroed" pages.

Figure 13:
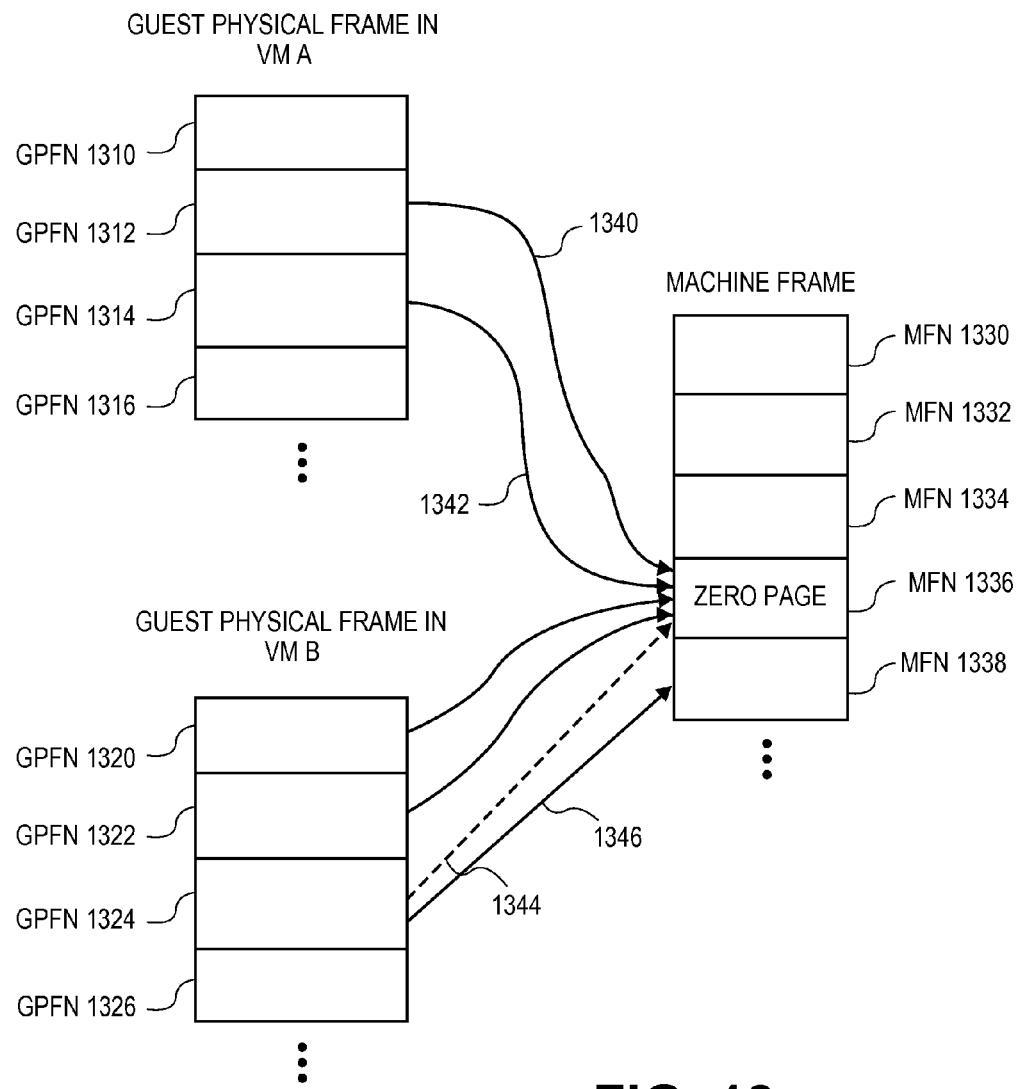
FIG. 13 is an illustration of guest physical frame numbers for two different virtual machines as well as the machine frame referenced thereby according to an embodiment of the invention.

To illustrate how zeroing a free page works, consider FIG. 13, which is an illustration of guest physical frame numbers for two different virtual machines as well as the machine frame referenced thereby according to an embodiment. As shown in FIG. 13, VM A comprises GPFNs 1310, 1312, 1314, and 1316, VM B comprises GPFNs 1320, 1322, 1324, and

1326. Also shown in FIG. 13 is the machine frame, comprising pages of memory associated with MFNs 1330, 1332, 1334, 1336, and 1338. The page of memory in the machine frame at MFN 1336 is a zero page, in that it is a page of memory that has been "zeroed" by being overwritten with the set of default content, which is a continuous set of zero values in this example.

As shown in FIG. 13, the pages of memory for VM A in the guest physical frame at GPFN 1312 and 1314 are free pages. Embodiments may perform the process of zeroing free pages in a variety of different ways. In an embodiment, the guest operating system will write over the contents of the pages of memory at GPFN 1312 and 1314 with all zero values and thereafter place GPFN 1312 and 1413 on the list of zero pages. The guest operating system may then instruct the hypervisor to update the mapping table for VM A to map each of GPFN 1312 and 1314 to the zero page, namely the page at MFN 1336.

In another embodiment, the guest operating system may inform the hypervisor when the pages at GPFN 1312 and/or 1314 no longer contain useful content, for example, after they are added to the free list. Upon being notified that the memory page at GPFN 1312 and/or 1314 is free, the hypervisor may update its mapping data for VM A to map the page at GPFN 1312 and/or 1314 to the zero page (i.e., the page at MFN 1336 in FIG. 13). Additionally, the guest operating system may add GPFN 1312 and 1314 to the zero list to so that these pages may be used for future memory allocations.

In other embodiments, the processing of zeroing free pages may be performed, at least in part, by a zero thread. A zero thread is a thread of execution that is designed to overwrite free pages with all zero values. In such an embodiment, the zero thread is modified so that the zero thread calls into the hypervisor to map the pages at GPFN 1312 and 1314 to the zero page (i.e., the page at MFN 1336 in FIG. 13). Additionally, the zero thread would either directly or indirectly cause the pages at GPFN 1312 and 1314 to be added to the zero list.

Other embodiments of the invention may perform the process of zeroing free pages by the hypervisor using an introspection process upon the guest operating system. The hypervisor may examine data structures within a guest operating system. In doing so, the hypervisor may walk the list of free pages maintained by the guest operating system to allow the hypervisor to map each of the free pages to the zero page (i.e., the page at MFN 1336 in FIG. 13). Thereafter, the hypervisor may update the data structures of the guest operating system to move those pages to the list of zero pages maintained by the guest operating system. In another embodiment, the hypervisor may traverse the list of zeroed pages to map each page in the list to the shared zero page in the machine frame rather than having to be involved with moving free pages to the list of zero pages.

In an embodiment, a guest operating system performs a read operation on a zeroed page in the guest physical frame the same way as normal. For example, a guest operating system reading the contents of the memory page at GPFN 1324 would read the content of the zero page at MFN 1336.

If the guest operating system wishes to write to a page that is mapped to the zero page at MFN 1336, then the hypervisor removes the GPFN-MFN pointer from that page in memory in the guest physical frame to which the guest operating system wishes to write, and thereafter the guest operating system writes to a new machine frame page. For example, if a guest operating system wishes to write to the page of memory at GPFN 1324, then GPFN-MFN pointer 1344 is removed from the mapping table maintained by the hypervisor. The mapping table maintained by the hypervisor is then updated so that GPFN 1324 now references a different, free machine frame page, such as MFN 1338. For example, as shown in FIG. 13, GPFN-MFN pointer 1346 may be created so that GPFN 1324 now references MFN 1338. Thereafter, the guest operating system may write to GPFN 1324 by storing the page at MFN 1338. In some embodiments it may be desirable that read operations to a shared zero page also cause a private zero page to be mapped in its place. Thus, a read operation may also be used as an indication that a page is now in use and hence likely to be written to soon. Allocating a private page once the read operation is observed avoids the need for a later hypervisor page fault.

As an optimization, the hypervisor and guest operating system may choose to ensure that some number of pages at the head end of the zero list are private zero pages, with the remainder of the zero list pages being mapped to the hypervisor shared zero page. This may be done so that the first few pages that the guest allocates can be used by the operating system without incurring the overhead of a hypervisor page fault for each page to make the pages private. Once the hypervisor receives a page fault for a page that is on the free list the hypervisor may be informed that all the earlier pages on the free list have now been used, and hence, it is a cue for the hypervisor to pre-emptively un-share some number of pages on the head of the zero list, thereby reducing the number of future page faults. The hypervisor may use introspection to enable itself to determine the pages on the head of the free list. Alternately, the hypervisor may keep its own shadow list of the contents of the guest zero list based on the pages the guest passes to the hypervisor when asking the hypervisor to map pages to the shared zero page. Another embodiment may have the guest spotting when some number of pages had been allocated from the zero page list and thus explicitly asking the hypervisor to make some batch of pages on the head of the zero list private (that were previously shared).

Advantageously, the amount of memory required to represent pages of memory at GPFN 1312 and 1314 is minimized since only GPFN-MFN pointer 1340 and GPFN-MFN pointer 1342 need be maintained. Zero pages in the guest physical frame require very little memory to represent since each zero page in any guest physical frame map to the same place, namely the zero page at MFN 1336.

In an embodiment, rather than having a single zero page in the machine frame, there may be a plurality of zero pages used. If there are a plurality of zero pages, an embodiment may be configured such that each zero page in the plurality of zero pages is associated with a different virtual machine, Each zero page in the plurality of zero pages may only be referenced by the virtual machine to which the zero page is associated. Unless otherwise stated herein, for simplicity the approaches described herein assume that there is a single zero page within the machine frame.

A newly instantiated virtual machine that is created using a template VM will possess a guest physical frame that is the same as the guest physical frame of the template VM. As such, the pages in the newly instantiated virtual machine will point to the same pages in the machine physical frame as the pages within the template VM. Over time, the pages with the guest physical frame of the newly instantiated virtual machine may diverge from the template VM; however, techniques will be discussed in the next section for ensuring that pages that are deemed helpful and/or necessary will not be evicted, which will decrease divergence.

In some embodiments, a VM that is to become the template VM is frozen, i.e., no longer executed, and becomes the template. In other embodiments, a snapshot of a VM may be transformed into a template, leaving the original VM intact. In this embodiment the template is effectively a clone of the original VM.

Preparing the Template VM for Template Creation

As explained above, a template VM may be used to create a new virtual machine, based on the template VM, using a copy-on-write (COW) process. It is desirable that the contents of memory in a newly created virtual machine be as useful for that virtual machine as possible. Therefore, the contents of the guest physical frame of the template VM is designed, as best possible, to comprise pages of memory deemed to be useful for the operations that are anticipated to be executed by virtual machines created using that template VM.

Figure 14:
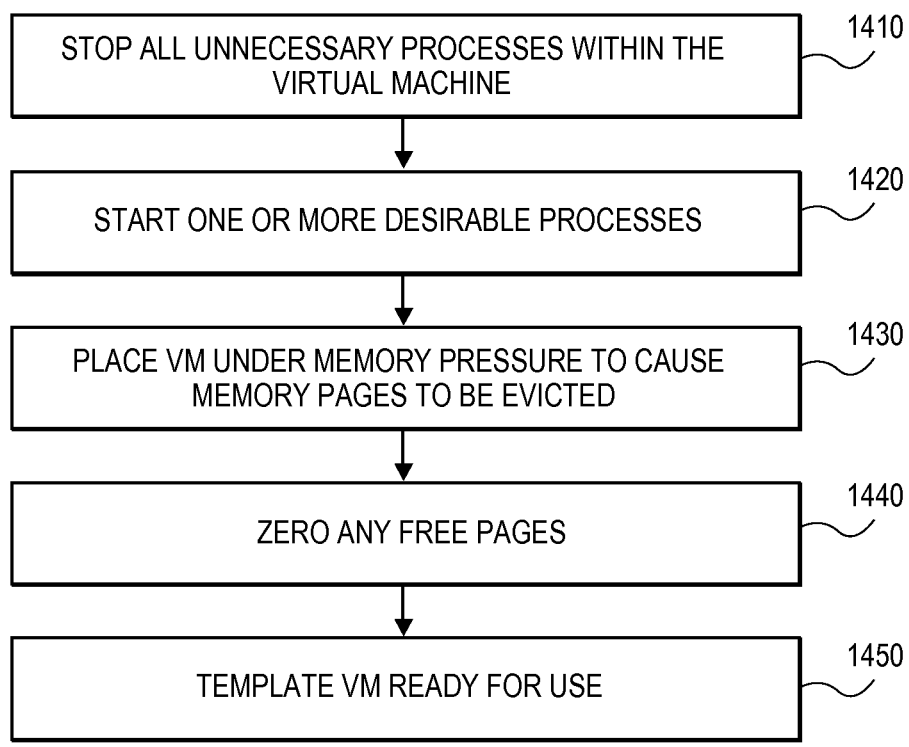
FIG. 14 is a flowchart illustrating the steps of preparing a template VM according to an embodiment of the invention.

In an embodiment, a template VM undergoes a process to ensure that the contents of its guest physical frame will be as useful as possible for other virtual machines created using the template VM. FIG. 14 is a flowchart illustrating the steps of preparing a template VM according to an embodiment. Initially, in step 1410, all processes within the template VM that are deemed unnecessary are stopped. Processes that are related to booting and/or initialization may not be used by a newly instantiated virtual machine created using the template VM, and therefore memory pages associated with such processes are not necessary to be included within the guest physical frame of the template VM.

Thereafter, in step 1420, one or more desirable applications or processes are started. The applications or processes that are started in step 1420 are those which are anticipated to be executed within a virtual machine created using the template VM. A script may be used to execute a set of applications and/or processes. Any libraries which are required by these applications or processes are brought into the pages of the guest physical frame of the template VM.

Next, in step 1430, the pages within the guest physical frame of the template VM are evaluated so that the less helpful pages are evicted. One approach for doing so involves putting the template VM under some memory pressure by reducing the number of pages which the guest physical frame may contain to evict a certain number of pages from the guest physical frame. Thereafter, the constraints on memory may be lifted to allow an additional number of pages to be brought back into the guest physical frame. To bring helpful pages back into the guest physical frame, one or more applications which are intended to be used within virtual machines based on the template VM may be executed again within the template VM to bring in pages into the template VM's guest physical frame which are needed by those application. For example, if a template VM is to be used to create virtual machines in which a web browser is to be run, then a web browser may be executed and several web sites visited to ensure that pages relevant to this activity are brought back into the guest physical frame.

Another approach for evicting less helpful pages performed by an embodiment is to ask the guest operating system kernel to "trim working set" or "trim the standby list" to cause it to select pages for eviction.

In step 1440, any free pages within the guest physical frame of the template VM are zeroed as discussed above in the section entitled "Handling Free Pages."

In step 1450, the template VM is ready for use in creating additional virtual machines using a copy-on-write process. In an embodiment, prior to using the template VM as a basis for creating other virtual machines using a copy-on-write process, any the VM may be halted to "freeze" the template VM, although not all embodiments may do so.

Note that some embodiments may employ more than one template. These templates may be unrelated (for example, different templates may be used for virtual machines executing different versions of an operating system), or they may have a copy-on-write relationship whereby a VM that was cloned from a template goes on to become a template itself. This may be useful if it is desirable to create templates that are a specialization of a previous template, for example, like the previous template but with characteristics to support one or more other applications.

In an embodiment, as part of preparing the template VM, execution of some applications that are running in the VM are suspended prior to taking the template snapshot. When a VM cloned from the template VM is created, only the applications that are desired to be active within that particular newly created VM are unsuspended. Hence, unwanted applications within the template VM do not consume any CPU or write to any memory (which would cause copy-on-write divergence). An alternative embodiment wouldn't suspend any applications within a VM before taking the template snapshot, but instead would suspend the unwanted applications as soon as the cloned VM is created, though this is not quite as efficient.

Further, prior to taking the template snapshot it is highly desirable to request the operating system to write-out all currently modified pages to disk (either to the file to which they belong or the page file if they are not part of a file) and wait for this operation to complete. This optimization avoids each VM created from the template VM from writing out the same modified pages at some later time resulting in IO being duplicated for every newly created VM.

An optional step which may be additionally performed and which is not reflected in the flowchart of FIG. 14 is that the guest physical frame of the template VM may be modified to include additional pages which are either anticipated or observed to be useful in the future by virtual machines created using the template VM. For example, assume that it is observed that shortly after each virtual machine created using a particular template VM, the newly created virtual machine loads a particular disk block into memory. In this example, it would be helpful to include that page as part of the guest physical frame of the template VM, since this page will likely be used by a virtual machine created using the template VM.

Managing the Eviction Process

When a guest operating system decides that a particular page of memory in the guest physical frame is no longer useful, the guest operating system may evict the page to make room for additional pages to be loaded into the guest physical frame. The guest operating system may employ a number of different algorithms or approaches for determining which pages to evict.

If an evicted page has been modified since it was loaded into memory, then the modifications to the page must be persistently stored, either to the file to which it belongs, or to a paging disk. If an evicted page has not been modified since the page was loaded into memory, then the page need not be persistently stored on the paging disk, since the evicted page is the same as the copy of the page that is persistently stored on the system disk and may be subsequently read, as needed, from the system disk. The eviction process is particularly relevant to memory mapped files, such as executable files and library files.

Upon instantiating a new virtual machine, the pages contained within the guest physical frame for the new virtual machine are those deemed most helpful for the intended use of the new virtual machine. As explained above, these pages may be configured to be particularly well-suited for the types of applications which will be executed within the newly instantiated virtual machine. Therefore, embodiments of the invention are designed to prevent a guest operating system from diverging too quickly or in an inappropriate manner to maximize the benefit of the correlation between the memory contents and the intended use of the virtual machine. Also, creating unnecessary or unwarranted divergence between the pages in memory of the newly instantiated virtual machine and the template VM increases the memory usage of the newly instantiated virtual machine needlessly, as the newly instantiated virtual machine does not use any memory upon creation. Indeed, an unfortunate scenario which should be avoided is where a page is evicted, additionally memory is allocated, and then the previously evicted page is brought back into memory. In this case, memory may need to be allocated again to bring back the page that was previously evicted, which is most unfortunate since this page was previously included in the guest physical frame without using any memory for that page when the virtual machine was created.

Therefore, in certain embodiments, the guest operating system may modify data structures maintained by the guest operating system to cause certain pages in the guest physical frame that are shared between VMs to become unlikely or ineligible for selection as a candidate for eviction. As a result, the guest operating system will tend not to select such pages for eviction from the guest physical frame (assuming such pages are even eligible for selection as a candidate for eviction), and instead, will tend to select other pages for eviction that are not shared between VMs and hence result in a system-wide optimization of machine memory usage.

There are a variety of different ways in which an embodiment may make it unlikely or impossible for a page in memory to become evicted. Every operating system may support different mechanisms for doing so; therefore the particular approach used to render a page in memory unlikely or ineligible for eviction may depend upon the particular type of the guest operating system. For example, one approach for doing so involves adjusting data structures within the guest operating system so that a particular page of memory has a high priority. Since lower priority pages of memory are candidates for eviction before higher priority pages, this approach ensures that the higher priority pages of memory are unlikely to be evicted. Similarly, the guest operating system may update the data structures maintained by the guest operating system discussed above to lower the priority of a page in memory, thereby rendering that page more likely become evicted.

An approach for rendering a page of memory ineligible for selection as a candidate for eviction is to update data structures maintained by the guest operating system to "lock" or "pin" the page, for example, as used to indicate that there is an outstanding I/O operation, such as a direct memory access (DMA) operation, to that page of memory. Advantageously, virtually all operating systems prevent a page of memory from being evicted if there is an outstanding I/O operation to that page in memory. In this approach, updating the data structures in this fashion causes the guest operating system to believe there is an outstanding I/O operation to a page in memory, even though none such exists. The fictitious I/O operation to a page in memory causes that page to become ineligible for selection as a candidate for eviction. Similarly, the guest operating system may update the data structures maintained by the guest operating system discussed above to remove the fictitious outstanding I/O operation to the page in memory, thereby rendering that page eligible for selection as a candidate for eviction.

In the embodiments discussed above, the guest operating system is responsible for updating data structures maintained by the guest operating system to render a page in memory to be unlikely or ineligible for selection as a candidate for eviction. However, this need not always be the case. In other embodiments, the hypervisor may use a process termed introspection to examine and update data structures maintained by the guest operating system. In this approach, the hypervisor itself may update the data structures maintained by the guest operating system in the ways discussed above to cause one or more pages in memory to be unlikely or ineligible for selection as candidates for eviction.

Similarly, in some embodiments, the hypervisor itself may also update the data structures maintained by the guest operating system in the ways discussed above to cause one or more pages in memory to be eligible for selection as a candidate for eviction. The hypervisor may only update the data structures maintained by the guest operating system in this manner if the hypervisor previously locked those pages. Otherwise, it may cause problems for the guest operating system as the hypervisor would be unlocking pages that the guest operating system is treating as non-pageable.

In an embodiment, when a guest operating system desires to perform a write operation to a page in memory that has been modified to be unlikely or ineligible as a selected candidate for eviction, then such a write operation is allowed. Performing the write operation may involve allocating a page of memory in the machine frame, updating the mapping table maintained by the hypervisor so that appropriate GPFN maps to the newly allocated page in the machine frame, and performing the requested write operation in the newly allocated page in the machine frame. Note that the copy-on-write process discussed above may be used, so that the mapping table maintained by the hypervisor need not be updated and the new page of memory need not be allocated until the write operation is performed. After the performance of the write operation, the hypervisor informs the guest operating system that the page of memory which was written to is no longer deserving of special treatment. After being so informed by the hypervisor, the guest operating system may modify data structures that the guest operating system maintains to cause that page of memory to become eligible for selection as a candidate for eviction.

The rationale for allowing the modified page to become eligible for eviction is that since the page has diverged from the corresponding page in the template VM by virtue of the modification to the page, then space in memory must be allocated to store the modified page. Since memory was needed to be allocated to store the modified page, there is no reason to prevent the modified page from being evicted if such page is deemed not useful at a later point in time.

Mitigating Eviction by Maintaining Mapping Tables

Certain embodiments may manage the eviction of pages differently than discussed above. Rather than updating certain data structures maintained by the guest operating system to affect the likelihood or eligibility of a particular page being selected for eviction, certain embodiments may maintain and use mapping data to efficiently read in pages from memory, rather than from disk, whenever possible. While embodiments have been discussed where hypervisor maintains a mapping table that comprises data about GPFN-MFN pointers, the hypervisor may also maintain data that maps locations in a page file to pages in the guest physical frame of a template VM, as shall be described in further detail below.

Figure 15:
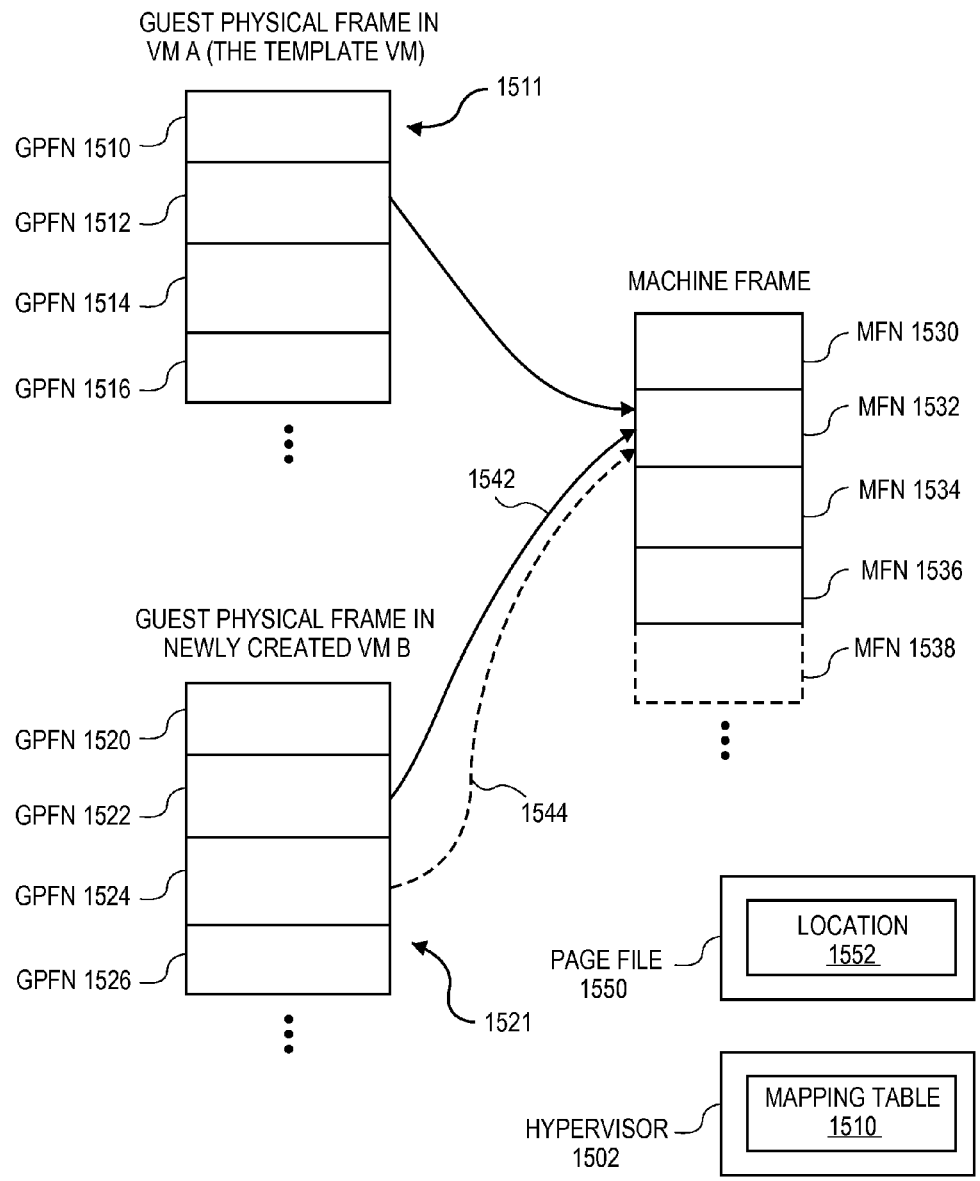
FIG. 15 is a block diagram of system which comprises a hypervisor that maintains a mapping table according to an embodiment of the invention.

FIG. 15 is a block diagram of system 1500 which comprises hypervisor 1502 that maintains mapping table 1510 according to an embodiment. System 1500 also includes template VM A and a newly created VM B. Newly created VM B was created based on template VM A. Template VM A includes guest physical frame 1511 comprising pages identified by guest physical frame numbers (GPFNs) 1510, 1512, 1514, and 1516. Also, newly created VM B includes guest physical frame 1521 comprising pages identified by guest physical frame numbers (GPFNs) 1520, 1522, 1524, and 1526. FIG. 15 also depicts the machine frame comprising pages identified by machine frame numbers (MFNs) 1530, 1532, 1534, 1536, and 1538. FIG. 15 depicts the page file for VM B as page file 1550. While each VM may have its own page file, only the page file for VM B (namely page file 1550) is depicted in FIG. 15.

Assume that VM B is created using a copy-on-write (COW) process using VM A. Thus, immediately after the creation of VM B, the pages in the guest physical frame of VM B are identical to that in the guest physical frame of the template VM. Once a page in the guest physical frame of an instantiated VM diverges from the corresponding page in the template VM used to create that instantiated VM, data may be updated to record this fact. Therefore, at any point in time, it may be determined whether a page in the GPFN of an instantiated VM is the same or has diverged from a corresponding page in the GPFN for the template VM used in its creation.

According to the prior art, if the page at GPFN 1522 in template VM B is evicted from memory, then the page at GPFN 1522 will be written to location 1552 in page file 1550. This is so because prior art techniques require that a copy of an evicted page to be written to disk.

In an improvement over the prior art, in an embodiment of the invention, if the page at GPFN 1522 is evicted, then rather than writing out the page at GPFN 1522 to location 1552 in page file 1550, mapping table 1510 is updated by hypervisor 1502 to store a reference that indicates that the page of memory associated with location 1552 in page file 1550 may be found at GPFN 1512 in template VM A. Hypervisor may determine that the page at GPFN 1522 is the same as the page at GPFN 1512 since (a) guest physical frame 1521 was instantiated based on guest physical frame 1511 in the template VM and (b) the page at GPFN 1522 has not yet been modified to diverge from the template VM. After mapping table 1510 has been updated in this manner as a result of the guest operating system writing out the page to the page file, the guest operating system may choose to re-purpose the page at GPFN 1522 which will typically result in the page being written to and hence, a different machine page being mapped in place.

At some point later in time, a process executing in VM B may require the page that formerly page at GPFN 1522 that was evicted, and the guest operating system executing within VM B may initiate a request to read that page back into guest physical frame 1521 in VM B from page file 1550. Advantageously, an I/O operation to read that page from page file 1550 to guest physical frame 1521 is unnecessary and may be avoided. In an embodiment, in response to hypervisor 1502 receiving notification that the guest OS in VM B would like to read in the page stored at location 1552 in page file 1550, hypervisor 1502 consults mapping data 1550 to determine whether location 1552 in page file 1550 corresponds to any page in a guest physical frame of a template VM. If hypervisor 1502 does determine that the requested page corresponds to a page in the guest physical frame of a template VM, then the read operation will not be performed against page file 1550, but instead, hypervisor 1502 updates mapping table 1510 to recreate the mapping between the guest physical frame in the instantiated VM to the guest physical frame in the template VM.

For example, in the above example, hypervisor 1502 would update mapping table 1510 to recreate a mapping between an available page in guest physical frame 1521 in VM B to the page at GPFN 1512 in template VM A. As depicted in FIG. 15, the page that was formerly stored at GPFN 1522 and was subsequently evicted may be read back into GPFN 1524. The GPFN to MFN mapping table associated with VM B is updated to create mapping 1544 to identify that the page at GPFN 1524 may be found at GPFN 1512 in the template VM. Note that when paging the page back in VM B, the guest operating system executing within VM B will likely nominate a different guest physical frame number than that which was originally used, e.g., in this example, the page that was evicted from GPFN 1522 was read back into GPFN 1524. This is not problematic as there is no requirement that a shared frame have the same GPFN across all virtual machines. Importantly, an I/O operation was avoided to read the evicted page back into guest physical frame 1521 since only mapping table 1510 was consulted and the GPFN to MFN mapping table associated with VM B was updated. Since an I/O operation was avoided, the operation is fast and efficient.

In an embodiment, hypervisor 1502 identifies, intercepts, and/or processes requests to write to page file 1550 so as to allow hypervisor 1502 to determine whether mapping table 1510 need be updated. To facilitate distinguishing write operations to page file 1550 of VM B over normal guest IO operations, in an embodiment page file 1550 for VM B may be implemented on a separate virtual disk that is used solely for the purpose of paging. In this way, hypervisor 1502 may easily ascertain when a IO request to write to a page file for a virtual machine is being issued.

The section above entitled "preparing the template VM for template creation" discussed how a template VM may be created. At the point where a snapshot of a VM is obtained to use as a template, it is likely that the guest operating system will have already written some pages to its page file. Indeed, the process of preparing a guest operating system for creating a template VM in an embodiment involves causing many modified pages to be written out to the page file. Thus, it is likely that some pages in the guest physical frame for the template VM will match pages in the page file for the template VM. In order to optimize for future page-in events that might occur, in an embodiment after taking the snapshot of a VM to use as a template VM, the contents of the page file are compared with the pages in the guest physical frame for the template VM to optimize the page file by removing pages from the page file that are present in the guest physical frame of the template VM and replacing the removed pages with a reference in the mapping table to the appropriate location in the guest physical frame of the template VM. This mapping table would be persisted along with the template VM. Thus, VMs created from the template VM would start with a page-file mapping table containing some initial mappings.

Another way of deducing the mappings between locations in the page file and locations in the guest physical frame of a template VM is to track which pages that are written to the page file, or read from the page file, remain "pristine" and are not subsequently modified. A pristine page in memory is identical to the corresponding version of the page that is stored on disk. Identifying when a page has been modified may be achieved by either (a) marking a page "read-only" and receiving a page fault if the page is written or (b) by using "dirty bits" that are available on some CPU nested paging implementations. This tracking may be used while a VM is booted and prepared for becoming a template VM, hence when the template snapshot is taken we have a complete list of which pages in memory correspond to pristine copies of pages on disk. Note that in building this list of mappings we must also watch for subsequent disk write operations to the on-disk pages which must cause the hypervisor to remove any prior corresponding mapping from its table as the page in memory is no longer a pristine copy of what is on disk. The new write may result in a new mapping being created if it is a full page write (as opposed to a partial page write, e.g., one sector, in which case the prior mapping would just be removed).

At the point a template snapshot is taken, the hypervisor can determine which pages in memory remain identical to the on-disk copy in the page file. Mapping table 1510 may be updated with references that map such blocks in the page file to the appropriate location where it may be found in the guest physical frame of the template VM. The blocks may optionally be removed from the page file to save disk space.

This technique may be generalized beyond the page file to track pristine-in-memory copies of page-sized blocks that are read from or written to any area of the disk, e.g., page-sized blocks belonging to files on the system disk. Thus, at the point we take the template snapshot we will have mappings for all of these pages as well. As described previously, this mapping table would be persisted alongside the template VM.

For VMs that are based on this template, if a page-sized read request for a disk block for which an entry exists in the mapping table is received, the disk JO may be avoided by updating the GPFN mapping table with a read-only mapping to the MFN containing the template page, providing the on-disk block has not been modified. Note that this scheme can work in conjunction with the previously described scheme where if we see a page-sized write of a page that is known to be shared with a template page, the write operation may be discarded and the mapping table may be updated such that any subsequent read operation will result in the destination page being re-mapped to the template page. Note that it may be necessary to consider a single large read or write request as a series of aligned page-size requests when performing the operations described above.

The above scheme requires that it is possible to tell that an on-disk block has not been modified. Fortunately this can normally be achieved fairly easily because VM virtual disk images are usually stored in a chain of copy-on-write virtual disk images, each of which would have a unique disk id. In some embodiments, the disk images are stored in individual files on the file system, but in others they would be held in a special image store file or partition. When creating a clone of a template, the new VM would be given the disk file chain of the template VM snapshot, but with the addition of a new initially empty disk file that would be used to store all the disk writes made by this particular VM clone. If the VM or template VM has multiple virtualized disk devices (whether PV or emulated) these would each have their own image chain.

Thus, mapping table 1510 described above can be augmented to additionally store the disk id of the particular image that holds the disk block that matches the in-memory copy. When performing a disk read operation, we can ask the hypervisor disk subsystem which particular layered image holds the latest version of a given block (hence which disk id would be used to service the request). If the disk id matches the disk id associated with block in mapping table 1510, we know we can safely apply the optimization as it is the most recent version of the block. If the disk id differs (e.g., the disk id of the image layer private to this VM) we know we cannot apply the optimization. In a simplified version of this scheme the hypervisor disk subsystem may simply indicate whether the block has been modified since the last snapshot was taken. Since the last snapshot will typically have been created when the VM template was created, this indication can be used to determine whether the optimization can be applied.

Storing and Restoring a Virtual Machine

A virtual machine may be "saved to disk" by unloading the virtual machine from the memory of the hypervisor and moving the virtual machine to a lower performance storage, which typically will be the disk. When a VM (or a template VM) is "saved to disk," the disk id (the disk id is the virtual disk file containing the disk block and refers to the particular virtual disk file in a potentially layered chain of copy-on-write files) and offset information associated with each page that is a pristine copy of something on disk may also saved. This information would be reloaded if the VM (or template VM) is later restored, and is thus available to enable continued operation of the mechanism described above. A virtual machine saved to disk in this fashion may be subsequently loaded back into memory.

Saving and Restoring a Virtual Machine Based on a Template

In the circumstance where a virtual machine is created based on a template VM, as an optimization to reduce the amount of data that is transferred to disk, only the pages in memory which are private (i.e., have been allocated as a result of a copy-on-write process) to this VM are saved to disk, while for non-private pages references to the corresponding locations in the template VM and/or zero pages are stored. Note that the template VM must be loaded before it is possible to restore any VM that was created using a copy-on-write process based on the template VM.

Dynamic Sizing of Memory Available to a Guest Operating System

A guest operating system is allocated a specified amount of memory. Certain applications, including the guest operating system, will change their behavior based upon how much memory is available to them. For example, if an application has a large amount of memory at its disposal, then it may allocate a larger heap of memory and be less aggressive about evicting pages from memory. Such behavior is to be expected, as maximizing the use of available memory does yield performance gains. However, in a multiple virtual machine environment, memory is the critical resource, not accessibility to the CPU. As a result, it is advantageous for virtual machines to behave in a manner that minimizes their use of memory as much as practically possible.

In certain prior approaches, a balloon driver has been used to limit the available memory to processing entities. A balloon driver is a mechanism which can render a portion of memory unusable by an application. Balloon drivers have been used to persuade an operating system that it has less memory available to cause it to be more frugal in its handling of memory.

In certain embodiments of the invention, the "size" of the balloon (i.e., how much memory is rendered unavailable) is based on how difficult it is for a guest operating system to operate. For example, the size of the balloon may be reduced if the guest operating system is having problems operating due to insufficient memory or the size of the balloon may be enlarged if the guest operating system has sufficient memory to operate.

If a guest operating system frequently must read or write pages from its page file on disk, then this is an indication that the guest operating system could use additional memory, and the size of the balloon may be reduced. In an embodiment of the invention, the page file for a guest operating system may be implemented in memory (termed a "memory-based page file"), rather than on disk. When a page of memory is written to the memory-based page file, the page may be first compressed prior to be written to the memory-based page file to allow more pages from a virtual machine to reside in main memory. The in-memory page-file may be backed by disk, thus if host or hypervisor memory becomes scarce, lesser used pages may be written to disk. This approach permits observation of the paging behavior of the guest operating system, but without performance degradation as would be the case if all evicted pages were written to a page file maintained on disk, since operations to disk involve a substantially slower I/O operation. In this way, embodiments of the invention may employ a balloon driver to dynamically adjust the size of available memory to a guest operating system based upon the real-time paging behavior of the guest operating system as it writes evicted pages to a memory-based paging file.

Hardware Mechanisms

Figure 9:
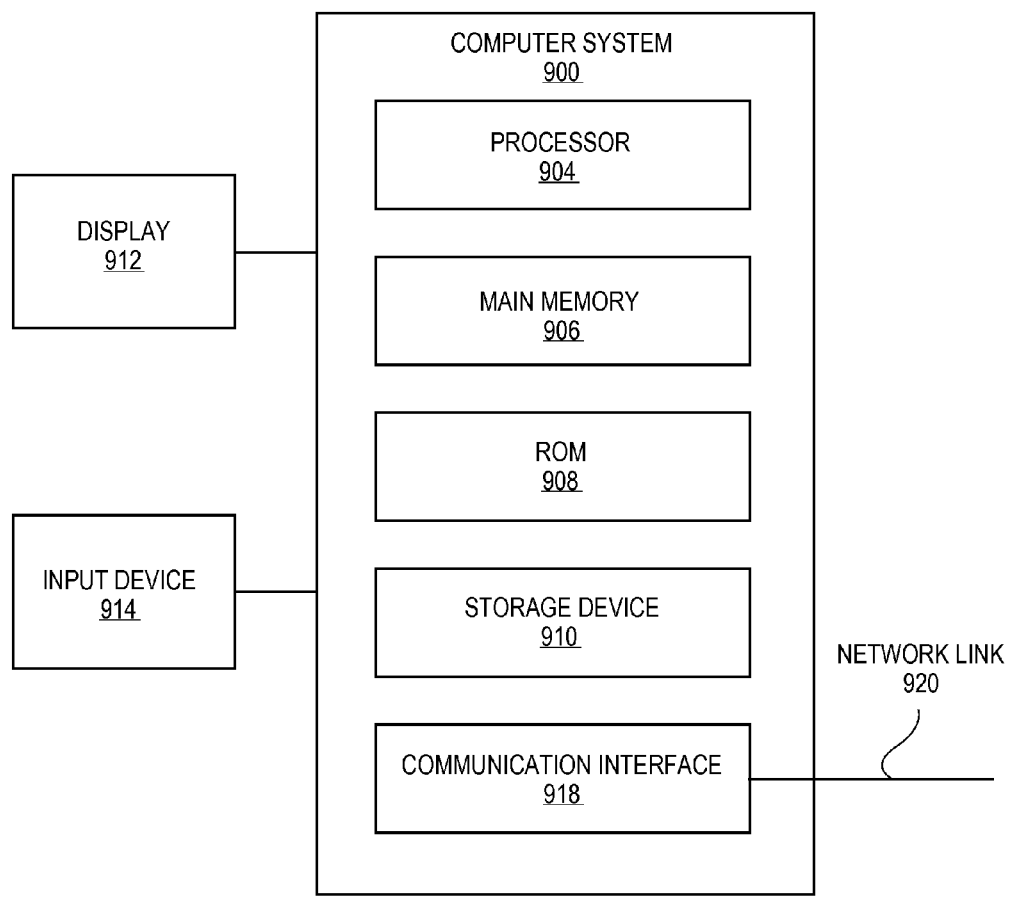
FIG. 9 is a block diagram that illustrates a computer system upon which an embodiment of the invention may be implemented.

In an embodiment, client 200 of FIG. 2 may be implemented on, include, or correspond to a computer system. FIG. 9 is a block diagram that illustrates a computer system 900 upon which an embodiment of the invention may be implemented. In an embodiment, computer system 900 includes processor 904, main memory 906, ROM 908, storage device 910, and communication interface 918. Computer system 900 includes at least one processor 904 for processing information. Computer system 900 also includes a main memory 906, such as a random access memory (RAM) or other dynamic storage device, for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device for storing static information and instructions for processor 904. A storage device 910, such as a magnetic disk or optical disk, is provided for storing information and instructions.

Computer system 900 may be coupled to a display 912, such as a cathode ray tube (CRT), a LCD monitor, and a television set, for displaying information to a user. An input device 914, including alphanumeric and other keys, is coupled to computer system 900 for communicating information and command selections to processor 904. Other non-limiting, illustrative examples of input device 914 include a mouse, a trackball, or cursor direction keys for communicating direction information and command selections to processor 904 and for controlling cursor movement on display 912. While only one input device 914 is depicted in FIG. 9, embodiments of the invention may include any number of input devices 914 coupled to computer system 900.

Embodiments of the invention are related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 904 for execution. For example, the instructions may initially be carried on a magnetic disk of a remote computer. The remote computer can load the instructions into its dynamic memory and send the instructions over a network link 920 to computer system 900.

Communication interface 918 provides a two-way data communication coupling to a network link 920 that is connected to a local network. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through a local network to a host computer or to data equipment operated by an Internet Service Provider (ISP).

Computer system 900 can send messages and receive data, including program code, through the network(s), network link 920 and communication interface 918. For example, a server might transmit a requested code for an application program through the Internet, a local ISP, a local network, subsequently to communication interface 918. The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions, which when executed by one or more processors, cause:
    upon a hypervisor determining that one or more guest physical frame numbers are assigned to free memory pages maintained by a guest operating system, the hypervisor updating mapping data to map the one or more guest physical frame numbers to a shared zero page within a machine frame.

2. The one or more non-transitory computer-readable storage mediums of claim 1, wherein the hypervisor determines that the one or more guest physical frame numbers are assigned to free memory pages by the guest operating system informing the hypervisor using a modified zero thread.

3. The one or more non-transitory computer-readable storage mediums of claim 1, wherein the hypervisor determines that the one or more guest physical frame numbers are assigned to free memory pages by the hypervisor performing introspection to read information within a guest operating system.

4. The one or more non-transitory computer-readable storage mediums of claim 1, wherein execution of the one or more sequences of instructions further causes:
    a modified zero thread instructing the hypervisor to map a particular guest physical frame number to the shared zero page in the machine frame.

5. The one or more non-transitory computer-readable storage mediums of claim 1, wherein execution of the one or more sequences of instructions further causes:
    the hypervisor traversing a list of free pages, maintained by the guest operating system, to map a portion of free pages in the list of free pages to the shared zero page in the machine frame and move that portion of free pages mapped to the shared zero page to a list of zeroed pages maintained by the guest operating system.

6. The one or more non-transitory computer-readable storage mediums of claim 1, execution of the one or more sequences of instructions further causes:
    the hypervisor traversing the list of zeroed pages, maintained by the guest operating system, to map a portion of pages in the list to the shared zero page in the machine frame.

7. The one or more non-transitory computer-readable storage mediums of claim 1, wherein execution of the one or more sequences of instructions further causes:
    the hypervisor traversing a list of free pages, maintained by the guest operating system, to map each free page in the list of free pages to the shared zero page in the machine frame and move each free page mapped to the shared zero page to a list of zeroed pages maintained by the guest operating system.

8. The one or more non-transitory computer-readable storage mediums of claim 1, execution of the one or more sequences of instructions further causes:
    the hypervisor traversing the list of zeroed pages, maintained by the guest operating system, to map each page in the list to the shared zero page in the machine frame.

9. The one or more non-transitory computer-readable storage mediums of claim 1, wherein execution of the one or more sequences of instructions further cause:
    zeroing any free pages in a guest physical frame for a newly instantiated virtual machine without the hypervisor periodically scanning pages of memory in the guest physical frame to identify pages of memory to map to the shared zero page.

10. The one or more non-transitory computer-readable storage mediums of claim 1, wherein execution of the one or more sequences of instructions further cause:
    ensuring that a certain number of pages at a head end of the list of zeroed pages are private zero pages.

11. The one or more non-transitory computer-readable storage mediums of claim 1, wherein execution of the one or more sequences of instructions further cause:
    in response to the hypervisor receiving a page fault for a page of memory previously listed on a list of zeroed pages, the hypervisor changing a number of pages on the head of the list of zeroed pages from being shared zeroed pages to private zeroed pages.

12. One or more non-transitory computer-readable storage mediums storing one or more sequences of instructions, which when executed by one or more processors, cause:
    upon a hypervisor determining that one or more guest physical frame numbers are assigned to free memory pages, the hypervisor updating mapping data to map the one or more guest physical frame numbers to a shared zero page within a machine frame; and
    in response to the hypervisor receiving a page fault for a page of memory previously listed on a list of zeroed pages, the hypervisor changing a number of pages on the head of the list of zeroed pages from being shared zeroed pages to private zeroed pages, wherein the hypervisor changing the number of shared zeroed pages to private zeroed pages comprises:
    the hypervisor identifying when pages in the list of zeroed pages should be changed from being shared zeroed pages to private zeroed pages by performing introspection upon the guest operating system or identifying when a certain number of pages have been allocated from the list of zeroed pages.

13. One or more non-transitory computer-readable storage mediums storing one or more sequences of instructions, which when executed by one or more processors, cause:
    upon a hypervisor determining that one or more guest physical frame numbers are assigned to free memory pages, the hypervisor updating mapping data to map the one or more guest physical frame numbers to a shared zero page within a machine frame; and
    in response to the hypervisor receiving a page fault for a page of memory previously listed on a list of zeroed pages, the hypervisor changing a number of pages on the head of the list of zeroed pages from being shared zeroed pages to private zeroed pages,
    wherein the number of pages corresponds to those pages on the list of zeroed pages which were added to the list of zeroed pages before the page of memory on which the page fault was received in addition to a certain number of pages which were added to the list of zeroed pages after said page of memory on the list of zeroed pages.

14. A machine-implemented method for reducing an amount of memory used by a virtual machine, comprising:
    upon a hypervisor determining that one or more guest physical frame numbers are assigned to free memory pages maintained by a guest operating system, the hypervisor updating mapping data to map the one or more guest physical frame numbers to a shared zero page within a machine frame.

15. The method of claim 14, wherein the hypervisor determines that the one or more guest physical frame numbers are assigned to free memory pages by the guest operating system informing the hypervisor using a modified zero thread.

16. The method of claim 14, wherein the hypervisor determines that the one or more guest physical frame numbers are assigned to free memory pages by the hypervisor performing introspection to read information within a guest operating system.

17. A client capable of creating a virtual machine with reduced memory requirements, comprising:
  one or more processors; and
  a machine-readable storage medium storing one or more sequences of instructions, which when executed by the one or more processors, cause: upon a hypervisor determining that one or more guest physical frame numbers are assigned to free memory pages maintained by a guest operating system, the hypervisor updating mapping data to map the one or more guest physical frame numbers to a shared zero page within a machine frame.

18. The client of claim 17, wherein the hypervisor determines that the one or more guest physical frame numbers are assigned to free memory pages by the guest operating system informing the hypervisor using a modified zero thread.

19. The client of claim 17, wherein the hypervisor determines that the one or more guest physical frame numbers are assigned to free memory pages by the hypervisor performing introspection to read information within a guest operating system.

20. The client of claim 17, wherein execution of the one or more sequences of instructions further cause:
  a modified zero thread instructing the hypervisor to map a particular guest physical frame number to the shared zero page in the machine frame.

21. The client of claim 17, wherein execution of the one or more sequences of instructions further cause:
  the hypervisor traversing a list of free pages, maintained by the guest operating system, to map a portion of free pages in the list of free pages to the shared zero page in the machine frame and move that portion of free pages mapped to the shared zero page to a list of zeroed pages maintained by the guest operating system.

22. The client of claim 17, execution of the one or more sequences of instructions further cause:
  the hypervisor traversing the list of zeroed pages, maintained by the guest operating system, to map a portion of pages in the list to the shared zero page in the machine frame.

23. The client of claim 17, wherein execution of the one or more sequences of instructions further cause:
  zeroing any free pages in a guest physical frame for a newly instantiated virtual machine without the hypervisor periodically scanning pages of memory in the guest physical frame to identify pages of memory to map to the shared zero page.

* * * * *